(12) United States Patent
Kobayashi et al.

(10) Patent No.: US 7,175,405 B2
(45) Date of Patent: Feb. 13, 2007

(54) COMPRESSION MOLDING MACHINE

(75) Inventors: Kazuhiko Kobayashi, Nagano (JP); Tsutomu Miyagawa, Nagano (JP); Tomokazu Asakura, Nagano (JP); Shusaku Tagami, Nagano (JP); Hideaki Nakazawa, Nagano (JP); Naoya Gotoh, Nagano (JP)

(73) Assignee: Apic Yamada Corporation, Nagano (JP)

( * ) Notice: Subject to any disclaimer, the term of this patent is extended or adjusted under 35 U.S.C. 154(b) by 301 days.

(21) Appl. No.: 10/305,241

(22) Filed: Nov. 27, 2002

(65) Prior Publication Data
US 2003/0102587 A1 Jun. 5, 2003

(30) Foreign Application Priority Data
Nov. 30, 2001 (JP) ............... 2001-366446
Nov. 30, 2001 (JP) ............... 2001-366474

(51) Int. Cl.
*B29C 33/56* (2006.01)
*B29C 33/68* (2006.01)
*B29C 43/36* (2006.01)
*B29C 43/58* (2006.01)

(52) U.S. Cl. ............ 425/116; 425/121; 425/125; 425/127; 425/193; 425/353; 425/544

(58) Field of Classification Search ............ 425/89, 425/116, 121, 123, 126.1, 125, 127, 193, 425/394, 353, 144–145, 544–545
See application file for complete search history.

(56) References Cited

U.S. PATENT DOCUMENTS

| | | | |
|---|---|---|---|
| 4,929,165 A * | 5/1990 | Inaba et al. | 425/150 |
| 5,522,713 A * | 6/1996 | Lian | 425/116 |
| 5,770,128 A | 6/1998 | Kobayashi et al. | |
| 5,832,816 A * | 11/1998 | Seto et al. | 100/48 |
| 6,050,802 A * | 4/2000 | Kobayashi | 425/116 |
| 6,743,389 B2 * | 6/2004 | Miyajima et al. | 425/89 |

FOREIGN PATENT DOCUMENTS

| | | | |
|---|---|---|---|
| JP | 63035325 A * | 2/1988 | |
| JP | 4-14419 A | 1/1992 | |
| JP | 5-84766 A | 4/1993 | |
| JP | 5-285977 A | 11/1993 | |
| JP | 9-155910 A | 6/1997 | |
| JP | 2000-277551 A | 10/2000 | |

* cited by examiner

*Primary Examiner*—Yogendra N. Gupta
*Assistant Examiner*—Thu Khanh T. Nguyen
(74) *Attorney, Agent, or Firm*—Birch, Stewart, Kolasch & Birch, LLP

(57) ABSTRACT

A compression molding machine capable of maintaining dies parallel while precisely clamping work pieces and improving quality of molded products and productivity. The compression molding machine includes a fixed platen; a movable platen; a fixed die being held by the fixed platen; a movable die being held by the movable platen; an open-close mechanism including a screw shaft connected to the movable platen, the open-close mechanism turning the screw shaft so as to move the movable die to and away from the fixed die, whereby the dies can be opened and closed. The fixed die can be taken out from the fixed platen in the direction crossing the open-close direction of the movable die.

5 Claims, 17 Drawing Sheets

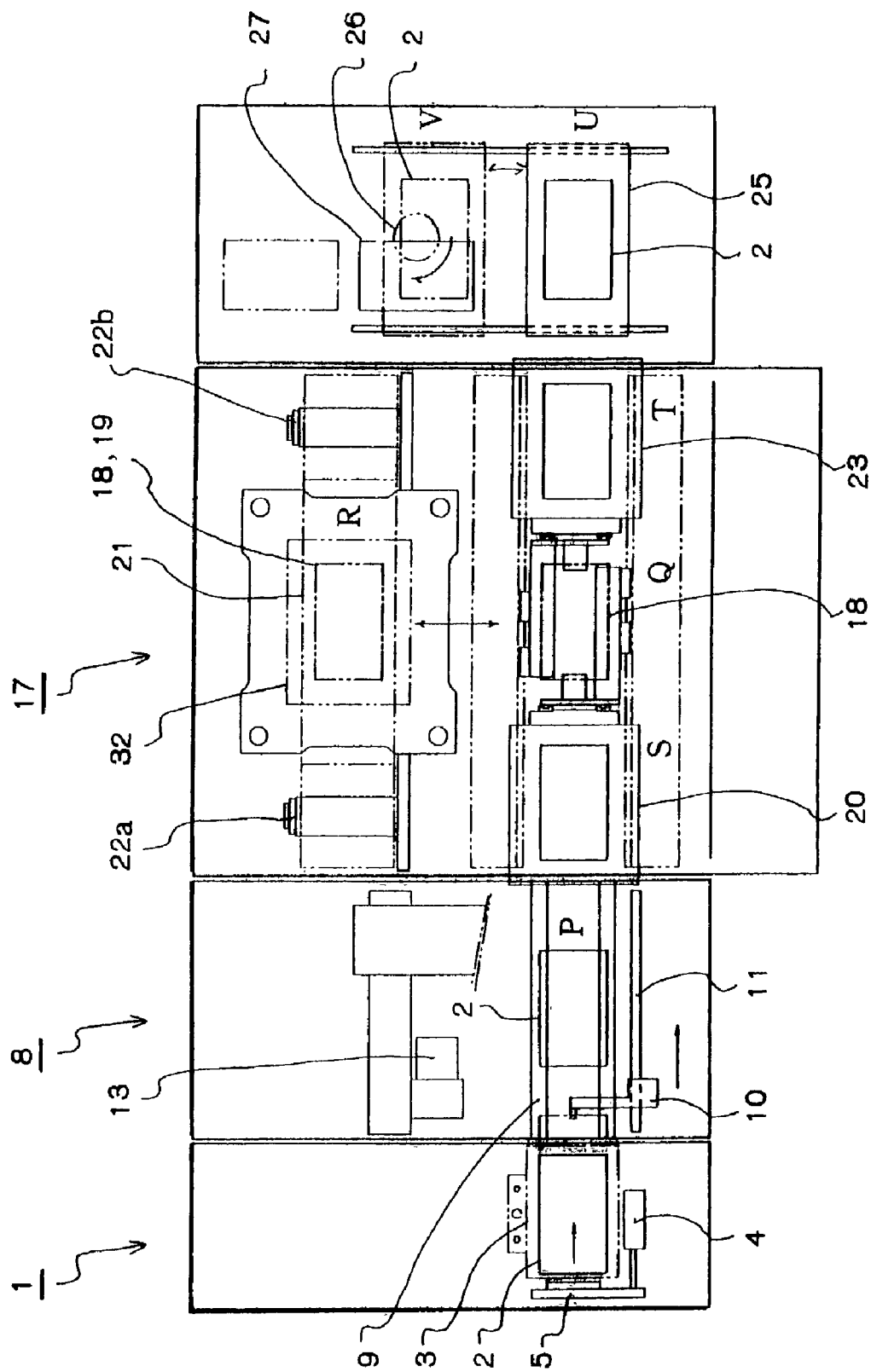

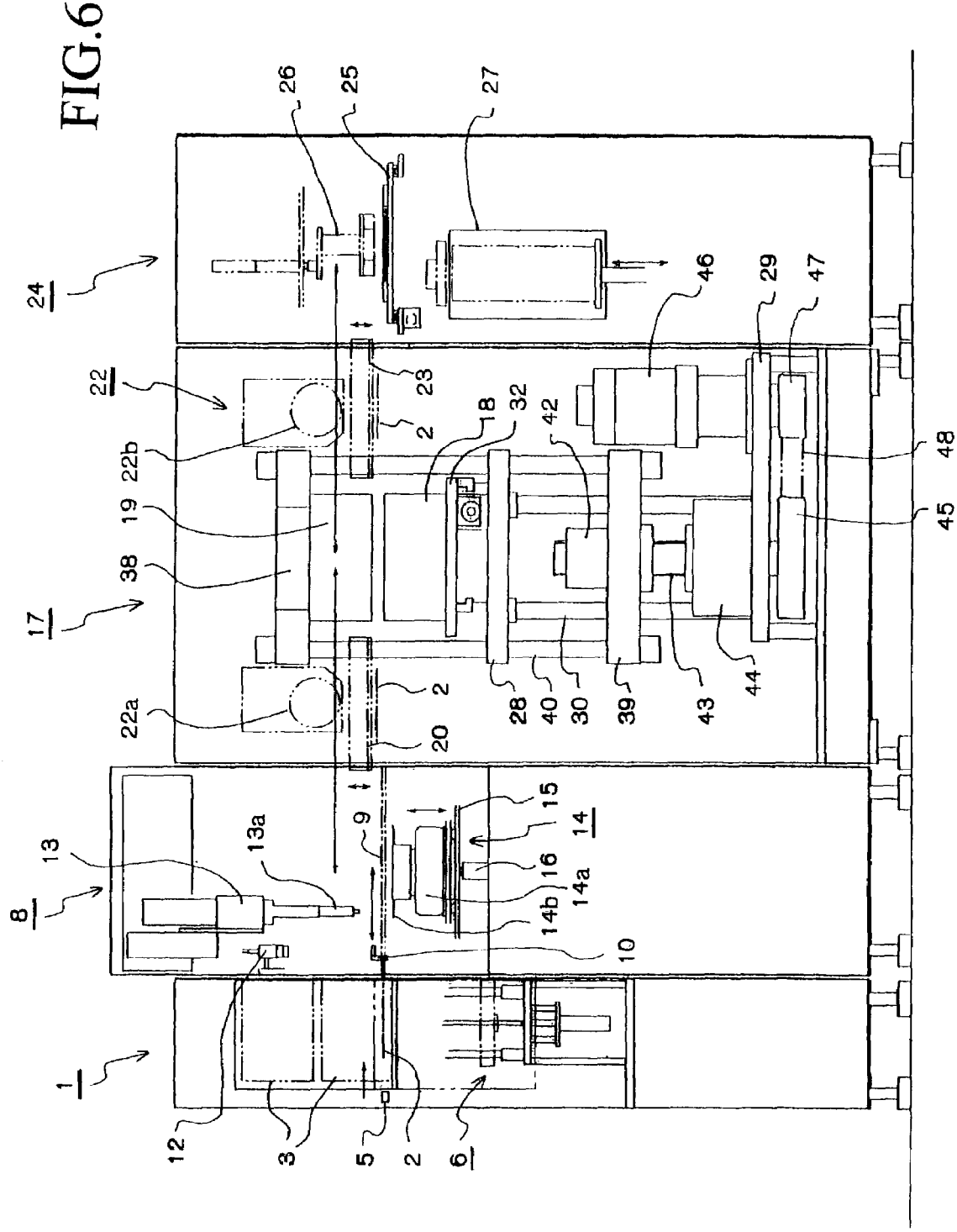

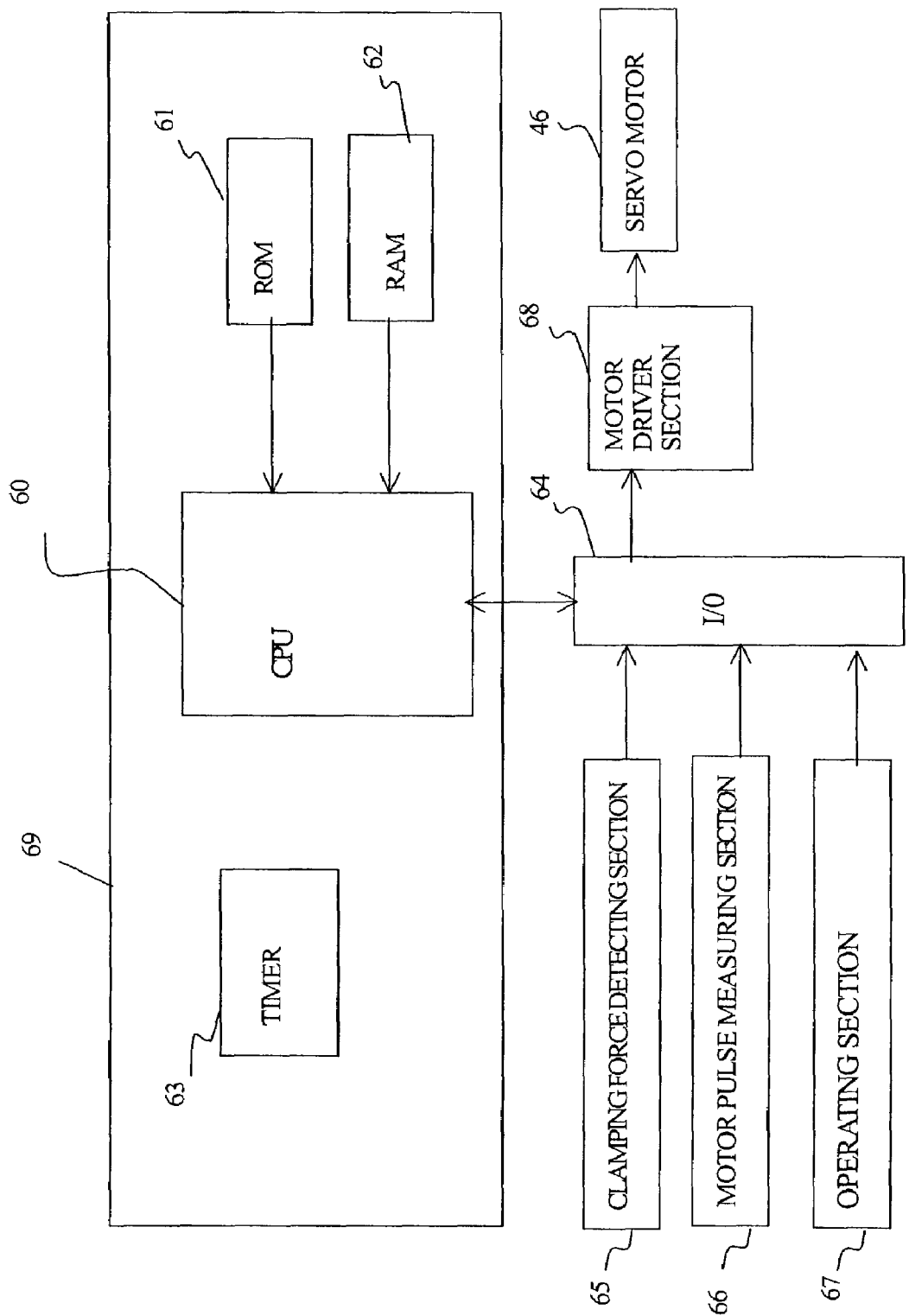

FIG.10

| t(s) | h(mm) | a(mm) | da/dt(mm/s) | M(mm³) |
|---:|---:|---:|---:|---:|
| 0 | 2 | 10.6 | 0.5 | 8000 |
| 0.4 | 1.96 | 10.9 | 0.6 | 8000 |
| 0.8 | 1.92 | 11.1 | 0.6 | 8000 |
| 1.2 | 1.88 | 11.3 | 0.6 | 8000 |
| 1.6 | 1.84 | 11.6 | 0.6 | 8000 |
| 2 | 1.8 | 11.8 | 0.7 | 8000 |
| 2.4 | 1.76 | 12.1 | 0.7 | 8000 |
| 2.8 | 1.72 | 12.4 | 0.7 | 8000 |
| 3.2 | 1.68 | 12.7 | 0.8 | 8000 |
| 3.6 | 1.64 | 13.0 | 0.8 | 8000 |
| 4 | 1.6 | 13.3 | 0.8 | 8000 |
| 4.4 | 1.56 | 13.6 | 0.9 | 8000 |
| 4.8 | 1.52 | 14.0 | 0.9 | 8000 |
| 5.2 | 1.48 | 14.4 | 1.0 | 8000 |
| 5.6 | 1.44 | 14.8 | 1.0 | 8000 |
| 6 | 1.4 | 15.2 | 1.1 | 8000 |
| 6.4 | 1.36 | 15.6 | 1.2 | 8000 |
| 6.8 | 1.32 | 16.1 | 1.2 | 8000 |
| 7.2 | 1.28 | 16.6 | 1.3 | 8000 |
| 7.6 | 1.24 | 17.2 | 1.4 | 8000 |
| 8 | 1.2 | 17.7 | 1.5 | 8000 |
| 8.4 | 1.16 | 18.3 | 1.6 | 8000 |
| 8.8 | 1.12 | 19.0 | 1.7 | 8000 |
| 9.2 | 1.08 | 19.7 | 1.8 | 8000 |
| 9.6 | 1.04 | 20.5 | 2.0 | 8000 |
| 10 | 1 | 21.3 | 2.1 | 8000 |
| 10.4 | 0.96 | 22.2 | 2.3 | 8000 |
| 10.8 | 0.92 | 23.1 | 2.5 | 8000 |
| 11.2 | 0.88 | 24.2 | 2.7 | 8000 |
| 11.6 | 0.84 | 25.3 | 3.0 | 8000 |
| 12 | 0.8 | 26.6 | 3.3 | 8000 |

FIG.13

| No. | t(s) | h(mm) | a(mm) | -da/dt(mm/s) |
|---|---|---|---|---|
| 1 | 0.0 | 35.68 | 2.00 | 0.112 |
| 2 | 0.5 | 36.21 | 1.94 | 0.107 |
| 3 | 1.1 | 36.75 | 1.89 | 0.103 |
| 4 | 1.6 | 37.28 | 1.83 | 0.098 |
| 5 | 2.1 | 37.81 | 1.78 | 0.094 |
| 6 | 2.7 | 38.34 | 1.73 | 0.090 |
| 7 | 3.2 | 38.87 | 1.69 | 0.087 |
| 8 | 3.7 | 39.40 | 1.64 | 0.083 |
| 9 | 4.3 | 39.94 | 1.60 | 0.080 |
| 10 | 4.8 | 40.47 | 1.55 | 0.077 |
| 11 | 5.3 | 41.00 | 1.51 | 0.074 |
| 12 | 5.8 | 41.53 | 1.48 | 0.071 |
| 13 | 6.4 | 42.06 | 1.44 | 0.068 |
| 14 | 6.9 | 42.59 | 1.40 | 0.066 |
| 15 | 7.4 | 43.13 | 1.37 | 0.063 |
| 16 | 8.0 | 43.66 | 1.34 | 0.061 |
| 17 | 8.5 | 44.19 | 1.30 | 0.059 |
| 18 | 9.0 | 44.72 | 1.27 | 0.057 |
| 19 | 9.6 | 45.25 | 1.24 | 0.055 |
| 20 | 10.1 | 45.78 | 1.21 | 0.053 |
| 21 | 10.6 | 46.32 | 1.19 | 0.051 |
| 22 | 11.2 | 46.85 | 1.16 | 0.050 |
| 23 | 11.7 | 47.38 | 1.13 | 0.048 |
| 24 | 12.2 | 47.91 | 1.11 | 0.046 |
| 25 | 12.8 | 48.44 | 1.09 | 0.045 |
| 26 | 13.3 | 48.98 | 1.06 | 0.043 |
| 27 | 13.8 | 49.51 | 1.04 | 0.042 |
| 28 | 14.4 | 50.04 | 1.02 | 0.041 |
| 29 | 14.9 | 50.57 | 1.00 | 0.039 |
| 30 | 15.4 | 51.10 | 0.98 | 0.038 |
| 31 | 16.0 | 51.63 | 0.96 | 0.037 |
| 32 | 16.5 | 52.17 | 0.94 | 0.036 |
| 33 | 17.0 | 52.70 | 0.92 | 0.035 |
| 34 | 17.5 | 53.23 | 0.90 | 0.034 |
| 35 | 18.1 | 53.76 | 0.88 | 0.033 |
| 36 | 18.6 | 54.29 | 0.86 | 0.032 |
| 37 | 19.1 | 54.82 | 0.85 | 0.031 |
| 38 | 19.7 | 55.36 | 0.83 | 0.030 |
| 39 | 20.2 | 55.89 | 0.82 | 0.029 |
| 40 | 20.7 | 56.42 | 0.80 | 0.028 |

FIG.15

| TIME(sec) | PLATEN SPEED (mm/sec) | | | | FLOWING SPEED OF RESIN (mm/sec) | | | | HEIGHT OF RESIN (mm) | | | |
|---|---|---|---|---|---|---|---|---|---|---|---|---|
| | r=1 | r=1.2 | r=1.3 | r=1.5 | r=1 | r=1.2 | r=1.3 | r=1.5 | r=1 | r=1.2 | r=1.3 | r=1.5 |
| 0 | 0.075 | 0.130305 | 0.157807 | 0.208121 | 0.398936 | 0.69311 | 0.839399 | 1.107024 | 2 | 2 | 2 | 2 |
| 1 | 0.075 | 0.130305 | 0.157807 | 0.208121 | 0.430628 | 0.793087 | 0.989369 | 1.379112 | 1.925 | 1.869695 | 1.842193 | 1.791879 |
| 2 | 0.075 | 0.130305 | 0.157807 | 0.208121 | 0.466251 | 0.916364 | 1.183437 | 1.765383 | 1.85 | 1.739391 | 1.684386 | 1.583759 |
| 3 | 0.075 | 0.108587 | 0.12139 | 0.138747 | 0.506485 | 0.868716 | 1.05723 | 1.413784 | 1.775 | 1.630803 | 1.562996 | 1.445012 |
| 4 | 0.075 | 0.108587 | 0.12139 | 0.138747 | 0.552161 | 0.997076 | 1.242773 | 1.730069 | 1.7 | 1.522216 | 1.441606 | 1.306265 |
| 5 | 0.075 | 0.090489 | 0.093377 | 0.092498 | 0.604306 | 0.939246 | 1.092986 | 1.335869 | 1.625 | 1.431727 | 1.348229 | 1.213767 |
| 6 | 0.075 | 0.090489 | 0.093377 | 0.092498 | 0.664202 | 1.070258 | 1.261702 | 1.565363 | 1.55 | 1.341237 | 1.254852 | 1.121269 |
| 7 | 0.075 | 0.075408 | 0.071828 | 0.061665 | 0.733465 | 1.001309 | 1.091972 | 1.168575 | 1.475 | 1.265829 | 1.183024 | 1.059603 |
| 8 | 0.075 | 0.075408 | 0.071828 | 0.061665 | 0.814155 | 1.132184 | 1.237706 | 1.317456 | 1.4 | 1.190422 | 1.111195 | 0.997938 |
| 9 | 0.075 | 0.06284 | 0.055253 | 0.04111 | 0.908933 | 1.051577 | 1.054325 | 0.955398 | 1.325 | 1.127582 | 1.055943 | 0.956828 |
| 10 | 0.075 | 0.06284 | 0.055253 | 0.04111 | 1.021277 | 1.179366 | 1.173967 | 1.043107 | 1.25 | 1.064742 | 1.00069 | 0.915718 |
| 11 | 0.075 | 0.052367 | 0.042502 | 0.027407 | 1.155813 | 1.087108 | 0.984941 | 0.738977 | 1.175 | 1.012375 | 0.958188 | 0.888311 |
| 12 | 0.075 | 0.052367 | 0.042502 | 0.027407 | 1.318797 | 1.208942 | 1.078496 | 0.786776 | 1.1 | 0.960009 | 0.915686 | 0.860904 |
| 13 | 0.075 | 0.043639 | 0.032694 | 0.018271 | 1.518853 | 1.105689 | 0.892185 | 0.547511 | 1.025 | 0.91637 | 0.882992 | 0.842633 |
| 14 | 0.075 | 0.043639 | 0.032694 | 0.018271 | 1.768138 | 1.219028 | 0.962112 | 0.57205 | 0.95 | 0.872731 | 0.850298 | 0.824362 |
| 15 | 0.075 | 0.036366 | 0.025149 | 0.012181 | 2.084238 | 1.106117 | 0.785887 | 0.392892 | 0.875 | 0.836366 | 0.825149 | 0.812181 |
| 16 | 0.075 | 0.036366 | 0.025149 | 0.012181 | 2.493351 | 1.208965 | 0.836075 | 0.404947 | 0.8 | 0.8 | 0.8 | 0.8 |

FIG. 17

| TIME(sec) | PLATEN SPEED (mm/sec) | | | | FLOWING SPEED OF RESIN (mm/sec) | | | | HEIGHT OF RESIN (mm) | | | |
|---|---|---|---|---|---|---|---|---|---|---|---|---|
| | r=1 | r=1.2 | r=1.3 | r=1.5 | r=1 | r=1.2 | r=1.3 | r=1.5 | r=1 | r=1.2 | r=1.3 | r=1.5 |
| 0 | 0.075 | 0.130305 | 0.157807 | 0.208121 | 0.669047 | 1.162399 | 1.407737 | 1.856564 | 2 | 2 | 2 | 2 |
| 1 | 0.075 | 0.130305 | 0.157807 | 0.208121 | 0.708525 | 1.286009 | 1.592442 | 2.189232 | 1.925 | 1.869695 | 1.842193 | 1.791879 |
| 2 | 0.075 | 0.130305 | 0.157807 | 0.208121 | 0.752045 | 1.433192 | 1.821394 | 2.634641 | 1.85 | 1.739391 | 1.684386 | 1.583759 |
| 3 | 0.075 | 0.108587 | 0.12139 | 0.138747 | 0.80021 | 1.315578 | 1.567423 | 2.015378 | 1.775 | 1.630803 | 1.562996 | 1.445012 |
| 4 | 0.075 | 0.108587 | 0.12139 | 0.138747 | 0.853745 | 1.458829 | 1.769511 | 2.34486 | 1.7 | 1.522216 | 1.441606 | 1.306265 |
| 5 | 0.075 | 0.090489 | 0.093377 | 0.092498 | 0.913527 | 1.332746 | 1.504992 | 1.745298 | 1.625 | 1.431727 | 1.348229 | 1.213767 |
| 6 | 0.075 | 0.090489 | 0.093377 | 0.092498 | 0.980627 | 1.469871 | 1.676065 | 1.965658 | 1.55 | 1.341237 | 1.254852 | 1.121269 |
| 7 | 0.075 | 0.075408 | 0.071828 | 0.061665 | 1.056363 | 1.335961 | 1.408465 | 1.426482 | 1.475 | 1.265829 | 1.183024 | 1.059603 |
| 8 | 0.075 | 0.075408 | 0.071828 | 0.061665 | 1.142377 | 1.464891 | 1.547215 | 1.560723 | 1.4 | 1.190422 | 1.111195 | 0.997938 |
| 9 | 0.075 | 0.06284 | 0.055253 | 0.04111 | 1.240731 | 1.324199 | 1.284791 | 1.108254 | 1.325 | 1.127582 | 1.055943 | 0.956828 |
| 10 | 0.075 | 0.06284 | 0.055253 | 0.04111 | 1.354055 | 1.443141 | 1.392655 | 1.183716 | 1.25 | 1.064742 | 1.000069 | 0.915718 |
| 11 | 0.075 | 0.052367 | 0.042502 | 0.027407 | 1.485746 | 1.297124 | 1.143335 | 0.825945 | 1.175 | 1.012375 | 0.958188 | 0.888311 |
| 12 | 0.075 | 0.052367 | 0.042502 | 0.027407 | 1.640259 | 1.404692 | 1.223854 | 0.865698 | 1.1 | 0.960009 | 0.915686 | 0.860904 |
| 13 | 0.075 | 0.043639 | 0.032694 | 0.018271 | 1.823541 | 1.255181 | 0.994194 | 0.596005 | 1.025 | 0.91637 | 0.882992 | 0.842633 |
| 14 | 0.075 | 0.043639 | 0.032694 | 0.018271 | 2.043694 | 1.350492 | 1.052081 | 0.615929 | 0.95 | 0.872731 | 0.850298 | 0.824362 |
| 15 | 0.075 | 0.036366 | 0.025149 | 0.012181 | 2.312008 | 1.199602 | 0.846573 | 0.419892 | 0.875 | 0.836366 | 0.825149 | 0.812181 |
| 16 | 0.075 | 0.036366 | 0.025149 | 0.012181 | 2.644639 | 1.28232 | 0.886805 | 0.429518 | 0.8 | 0.8 | 0.8 | 0.8 |

COMPRESSION MOLDING MACHINE

This nonprovisional application claims priority under 35 U.S.C. § 119(a) on Patent Application No. 2001-366446 and 2001-366474 filed in JAPAN on Nov. 30, 2001, which is herein incorporated by reference.

BACKGROUND OF THE INVENTION

The present invention relates to a compression molding machine, in which a work piece is clamped and compressed between dies together with resin so as to mold the work piece with the resin.

Many types of machines have been developed to manufacture semiconductor devices. Especially, transfer molding machines have been used to mold semiconductor chips with resin. In the transfer molding machine, resin is supplied from pots to cavities, which are formed in an upper die and/or a lower die, via runners and gates, so as to mold work pieces set in the cavities.

In the transfer molding machine, for example, a plungers of a multi-plunger unit are respectively provided in pots of the lower die. The plungers are supported by a pressure equalizing unit and driven by a transfer mechanism. After resin tablets are supplied into the pots and the work pieces are set in the cavities of the lower die, an open-close mechanism clamps the work pieces between the dies. Then, the transfer mechanism drives the plungers to exert pressure on the resin melt in the pots, so that the resin is supplied into the cavities (see Japanese Patent Gazettes No. 5-285977 and No. 9-155910).

The movable die of the resin molding machine should have enough opening stroke so as to set the work pieces in the cavities and take out molded products therefrom. The dies should generate a required clamping force. The movable die should be moved at a required clamping speed so as to secure proper manufacturing efficiency.

The open-close mechanism has a pair of toggle links, which act as reduction units for reducing rotational speed of an electric motor and transmitting torque therefrom. In each of the toggle links, link pieces having different length are pivotably connected. The toggle link moves at a relatively high speed, with lower reduction ratio, at a die-opening position; the toggle link moves at a relatively low speed, with higher reduction ratio, at a die-closing position (see Japanese Patent Gazettes No. 5-285977 and No. 9-155910).

In another type of the open-close mechanism, a ball bearing screw is connected to a movable platen. The ball bearing screw is turned to open and close dies (see Japanese Patent Gazette No. 5-84766).

Compression molding machines have been also used to mold work pieces. In the compression molding machines, resin of a required amount is supplied to work pieces, then the work pieces are clamped and compressed between a fixed die and a movable die together with the resin. By compressing the work pieces together with the resin, the work pieces can be molded with the resin. No resin paths, e.g., runners, gates, are formed in the dies, so maintenance of the compression molding machine is easy. Further, the compression molding machine is preferably used to mold thin work pieces having thickness of, for example, about 0.8 mm. Lead frame type packages, e.g., QFN (Quad Flat Non-leaded), SON (Small Outline Non-leaded), and CSP (Chip Size Package), in which semiconductor chips are matrically arranged on one face of a substrate or a circuit board, are preferably molded by the compression molding machine. Note that, in the QFN or SON package, preferably a tape is adhered on one side face of a lead frame.

In the compression molding machine, a movable die is moved at a lower speed when the work pieces are actually clamped and released; the movable die is moved at a relatively high speed in other states as well as the transfer molding machine (see Japanese Patent Gazette No. 4-14419).

In the case of molding the thin work pieces, e.g., QFN, SON, CSP, by the transfer molding machine, there are some disadvantages.

The transfer mechanism connected to the plungers is located in a lower part of the lower die, so through-holes, in which the plungers are moved upward and downward, are formed in a lower platen, which holds the lower die. With this structure, parts of the lower platen corresponding to the through-holes apply no pressure to the dies when the dies are closed. Namely, pressure applied to the dies is partially different, so that the dies are slightly deformed. By the slight deformation of the dies, flashes are formed in molded products.

If the toggle links are used in the open-close mechanism, length of link pieces and positions of pivoting points are sometimes slightly deviated within ranges of manufacturing allowances, so that the lower platen is move with slight inclination. Therefore, degree of parallel between the movable platen and the fixed platen is made lower, so that pressure applied to the dies is partially different and the dies are slightly deformed. By the slight deformation of the dies, flashes are formed in molded products and quality of the molded products are made lower.

In the case of driving the movable die by the ball bearing screw, the movable platen can be maintained parallel to the fixed die while opening and closing the dies. But, a high power motor is required to control the clamping speed and generate the clamping torque as well as the toggle links, so that the molding machine must be large. It takes a long time to move the movable platen with an ordinary stroke, e.g., 200–300 mm, so productivity is low.

If the work pieces are set and the molded products are taken out in a limited space between the opened dies, working efficiency is low. And, the space is too narrow to install a dispenser for supplying the liquid resin.

In the case of molding the work pieces having thin package sections by the transfer molding machine, amount of the resin is small and a conveying distance of the resin is long, so there is possibility of solidifying the resin while conveying. Therefore, it is difficult to uniformly supply the resin to package sections of the work pieces, so the conveying distance of the resin should be short.

On the other hand, in the case of molding the work pieces by the compression molding machine, if the movable die is moved at a fixed speed, a flowing speed of the resin immediately after beginning the clamping action is not equal to that immediately before terminating the clamping action. If semiconductor chips are wire-bonded to a substrate, the flowing speed of the resin must be low so as not to damage bonding wires; the clamping speed must be the minimum speed, so that it takes a long time to close the dies and productivity must be lower. For example, the clamping speed of the movable die should be reduced to $1/10$–$1/100$ of the conventional machine. Thus, the compression molding should be executed with considering the relationship between the clamping speed and the flowing speed of the resin so as to maintain quality and productivity without damaging products.

SUMMARY OF THE INVENTION

A first object of the present invention is to provide a compression molding machine capable of maintaining dies parallel, precisely clamping work pieces and improving quality of molded products and productivity.

A second object is to provide an open-close mechanism of a compression molding machine capable of compression-molding work pieces without damaging products and improving quality of products and productivity.

A third object is to provide a method of opening and closing dies capable of compression-molding work pieces without damaging products and improving quality of products and productivity.

To achieve the objects, the present invention has following structures.

The compression molding machine of the present invention comprises:
a fixed platen;
a movable platen;
a fixed die being held by the fixed platen;
a movable die being held by the movable platen;
an open-close mechanism including a screw shaft connected to the movable platen, the open-close mechanism turning the screw shaft so as to move the movable die to and away from the fixed die, whereby the dies can be opened and closed,
wherein the fixed die can be taken out from the fixed platen in the direction crossing the open-close direction of the movable die.

In the compression molding machine, the open-close mechanism may further include a servo motor for turning the screw shaft, and
the open-close mechanism may stop the servo motor when a clamping force of the dies reaches a prescribed value.

In the compression molding machine, the fixed die may be a lower die, and
the lower die may be moved between a clamping position, at which the work piece is clamped between the dies, and a transfer position, at which the work piece is transferred to the lower die and a molded product is transferred from the lower die.

In the compression molding machine, the movable die may be an upper die, and
a film feeding mechanism, which feeds release film over a parting face of the upper die including a cavity, may be provided to the movable platen.

The open-close mechanism, which opens and closes a fixed die and a movable die, controls a clamping speed of the movable die so as to adjust a flowing speed of liquid resin, which is extended on a work piece, until completing the extension of the liquid resin when the work piece is clamped together with the liquid resin.

In the open-close mechanism, the control may comprise the steps of:
dividing a distance of flowing the liquid resin until completing the extension into a plurality of sub-distances, which are varied in geometrical progression;
selecting a common ratio of the geometrical series of the sub-distances; and
controlling the clamping speed of the movable die so as to adjust the flowing speed of an edge of the extending liquid resin in each sub-distance.

In the open-close mechanism, the clamping speed of the movable die may be reduced so as to reduce the flowing speed of the liquid resin as the liquid resin approaches to a terminal end of a cavity.

The open-close mechanism may further comprise:
a screw shaft connected to a movable platen, by which the movable die is held; and
a servo motor for turning the screw shaft so as to move the movable die, and
the clamping speed of the movable die may be controlled by varying revolution number of the servo motor.

The method of opening and closing a fixed die and a movable die of a compression molding machine comprises the steps of controlling a clamping speed of the movable die so as to adjust a flowing speed of liquid resin, which is extended on a work piece, until completing the extension of the liquid resin when the work piece is clamped together with the liquid resin.

In the method, the control may comprise the steps of:
dividing a distance of flowing the liquid resin until completing the extension into a plurality of sub-distances, which are varied in geometrical progression;
selecting a common ratio of the geometrical series of the sub-distances; and controlling the clamping speed of the movable die so as to adjust the flowing speed of an edge of the extending liquid resin in each sub-distance.

In the method, the clamping speed of the movable die may be reduced so as to reduce the flowing speed of the liquid resin as the liquid resin approaches to a terminal end of a cavity.

In the compression molding machine of the present invention, the screw shaft is connected to the movable platen and the movable die is moved to open and close the dies. With this structure, the movable die can be moved with maintaining parallel to the fixed die. Since no through-holes are bored in the fixed platen which holds the fixed die, enough pressure can be applied while closing the dies, no resin flashes are formed in molded product and quality of the product can be improved.

The fixed die can be moved between the clamping position and the transfer position so as to set the work piece and take out the product, so that the stroke of the movable die can be shorter. By shortening the stroke of the movable die, the movable die may be driven at a lower clamping speed, so that a large driving source is not required, the size of the molding machine can be smaller and productivity of the molding machine can be improved.

By employing the servo motor for turning the screw shaft to open and close the dies, the control of the movable die can be simplified and thickness of a molded section can be precisely controlled.

By employing the open-close mechanism and the method, the work piece is clamped by the dies together with the liquid resin, and the clamping speed of the movable die can be controlled to flow the liquid resin at a desired flowing speed from the beginning of the extension of the resin until the termination thereof. Therefore, the compression-molding can be executed with considering the flowing speed of the resin, so that damage of the product can be prevented and quality of the product and productivity of the molding machine can be improved.

For example, the distance of flowing the liquid resin until completing the extension is divided into a plurality of sub-distances, which are varied in geometrical progression, then a common ratio of the geometrical series of the sub-distances is selected, and the clamping speed of the movable die is controlled so as to adjust the flowing speed of the edge of the extending liquid resin in each sub-distance. Further, the clamping speed of the movable die is reduced so as to reduce the flowing speed of the liquid resin as the liquid resin approaches to the terminal end of the cavity. With this control, the flowing speed of the edge of the liquid resin can be properly controlled in each sub-distance, so that action of the liquid resin can be stable and quality of the product can be improved. Further, productivity can be improved by selecting an optimum clamping speed.

BRIEF DESCRIPTION OF THE DRAWINGS

Embodiments of the present invention will now be described by way of examples and with reference to the accompanying drawings, in which:

FIG. 5 is a plan view of the compression molding machine;

FIG. 6 is a front view of the compression molding machine;

FIG. 8 is a block diagram of a control system of an open-close mechanism;

FIG. 10 is a data table showing a relation ship among height, width and flowing speed of the liquid resin;

FIG. 13 is a data table showing a relation ship among height and radius of the liquid resin and a clamping speed;

FIG. 15 is a data table showing a relation ship among common ratio "r", a platen speed, and height and an extension speed of an edge of the liquid resin applied on a rectangular work piece;

FIG. 17 is a data table showing a relation ship among the common ratio "r", the platen speed, and height and an extension speed of an edge of the liquid resin applied on a circular work piece;

DETAILED DESCRIPTION OF THE EMBODIMENTS

Preferred embodiments of the present invention will now be described in detail with reference to the accompanying drawings.

Firstly, an outline of a compression molding machine of the present embodiment will be explained with reference to FIGS. 5–7B.

In FIGS. 5 and 6, a plurality of work pieces, in each of which one side face will be molded with resin, are accommodated in a work piece feeding section 1. In the present embodiment, the work piece is a substrate 2 (see FIG. 7B), e.g., a film substrate, a lead frame, a plastic substrate, on which a plurality of semiconductor chips are matrically arranged. A plurality of the substrates 2 are accommodated in each magazine 3. Note that, in the case of molding lead frames, preferably a tape is adhered on a bottom face of each lead frame so as not to drop liquid resin, which has low viscosity, from the lead frame.

Figure 7A:
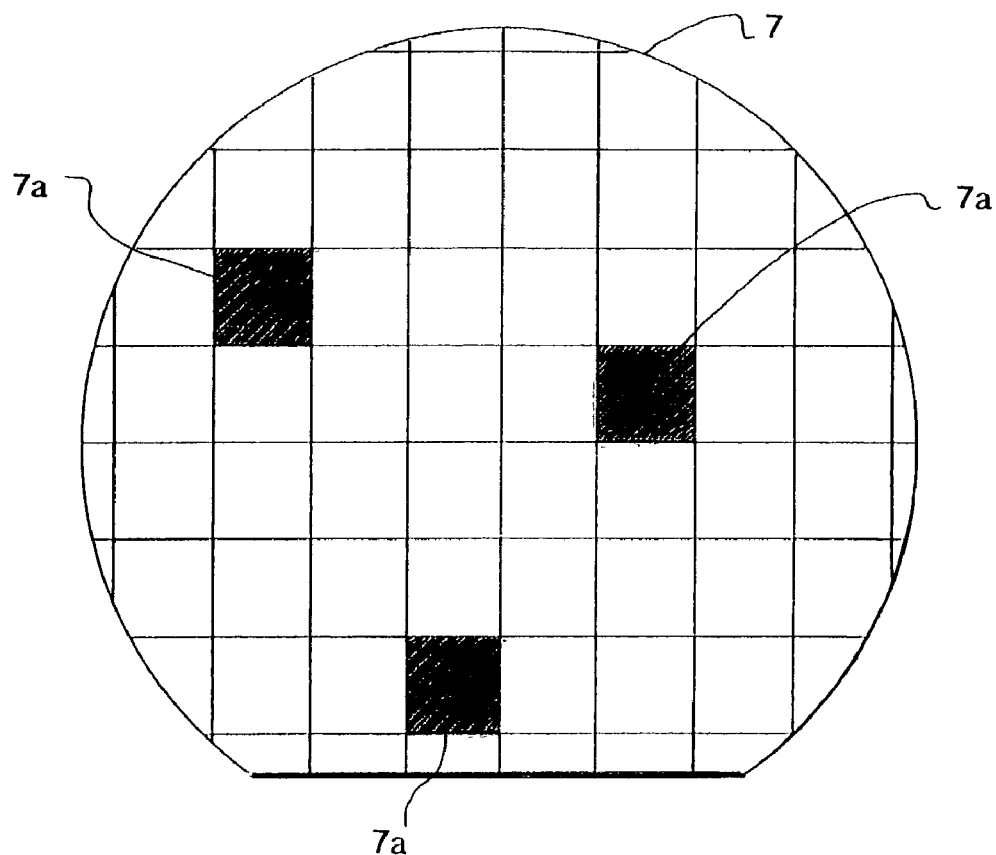
FIGS. 7A and 7B are explanation views of a work piece.
Figure 7B:
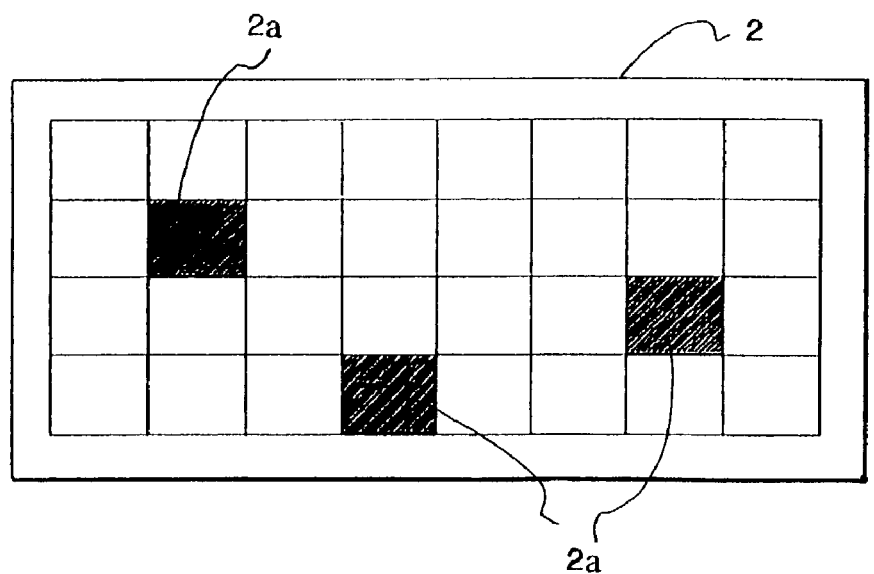

Slits are formed in side faces of the magazines 3, and a pusher 5, which is actuated by an actuator 4, pushes the lowermost substrate 2 outward. As shown in FIG. 6, a plurality of the magazines 3 are piled on and supported by an elevator mechanism 6. When one substrate 2 is pushed out from the magazine 3, the elevator mechanism 6 downwardly moves one pitch so as to push the next substrate 2. This action is repeated to continuously supply the substrates 2. Note that, other work pieces other than the substrate 2 can be molded by the compression molding machine. Another example of the work piece is shown in FIG. 7A. FIG. 7A shows a silicon wafer 7 on which semiconductor chips are matrically arranged. In FIGS. 7A and 7B, rectangular sections divided by horizontal and vertical lines will be molded as package sections. Note that, semiconductor chips are not provided in the sections 2a and 7a.

A resin supplying unit 8 supplies liquid resin to the substrates 2, which have been fed from the work piece feeding section 1. The resin supplying unit supplies a fixed volume of the liquid resin. A front end of the substrate 2, which has been outwardly pushed from the magazine 3 by the pusher 5, is received by supporting rails 9. The front end of the substrate 2 is chucked by a chucking member 10, and the chucking member 10 is moved along a guide rail 11, which is parallel to the supporting rails 9, together with the substrate 2. The substrate 2 is conveyed to a position "P" on the supporting rails 9. A camera 12 reads image data of the substrate 2 before supplying the liquid resin so as to detect the chipless sections 2a.

A dispenser 13 dispenses or drops the liquid resin onto the substrate 2. The dispenser 13 can be horizontally moved over the substrate 2 in the X- and Y-directions. The liquid resin is sent from a tank (not shown) to the dispenser 13 via a tube. The dispenser 13 is moved in the Z-direction so as to adjust its height, then horizontally moved over the substrate 2 in the X- and Y-directions so as to dispense the fixed volume of the liquid resin in an optional pattern.

A weighing unit 14 measures weight of the substrate 2 and/or volume of the liquid resin supplied on the substrate 2. The weighing unit 14 has a unit proper 14a and a measuring board 14b. By setting the substrate 2 onto the measuring board 14b, the unit proper 14a measures the weight of the substrate 2. The weighing unit 14 is provided under the supporting rails 9 and corresponds to a dispensing position "P". The measuring board 14b is a rectangular board arranged along and between the supporting rails 9. The unit proper 14a is provided on a supporting table 15, and the supporting table 15 is connected to a vertical cylinder 16. With this structure, the supporting table 15 can be moved in the vertical direction.

The compression molding machine 17 clamps and compression-molds the substrate 2 between a lower die 18, which is a fixed die, and an upper die 19, which is a movable die. In the present embodiment, the dies disclosed in Japanese Patent Gazette No. 2000-277551 are employed. Namely, a damper is provided to enclose the upper die 19 and always biased toward the lower die 18. The substrate 2, on which the liquid resin has been supplied from the resin supplying unit 8, is transferred from the supporting rails 9 to the lower die 18, which has been waited at a transfer position "Q" by a loader 20. The lower die 18 can be moved between a clamping position "R", at which the lower die 18 corresponds to the upper die 19, and the transfer position "Q", at which the lower die 18 receives the substrate 2 from the loader 20. A cavity (not shown) is formed in the upper die 19, and its parting face is covered with release film 21.

The release film 21 is wound on a feeding roll 22a of a film feeding mechanism 22 and fed onto the upper die 19; used parts of the release film 21 are wound on a collecting roll 22b. The release film 21 can stand temperature of the dies and can be easily peeled from the upper die 19. The release film 21 is made of a soft and extensible material, e.g., PTFE, ETFE, PET, FEP, glass cloth including fluorine, polypropylene, polyvinylidene chloride. The release film 21 is fixed on the parting face of the upper die 19 by sucking air through sucking holes (not shown), which are opened in the parting face.

After completing the compression mold, the dies 18 and 19 are opened. Since the release film 21 is easily peeled from solidified resin, the release film 21, which has been sucked and held by the upper die 19, separates from the molded substrate (molded product) 2, so that the molded product 2 is left in the lower die 18. The molded product 2 is conveyed from the clamping position "R" to the transfer position "Q" together with the lower die 18 and take out therefrom. The molded product 2 is taken out and conveyed to a product accommodating section by an unloader 23.

A product accommodating unit 24 includes: a moving table 25 receiving the molded product 2; a pick-up 26 sucking and correctly heading the molded product 2; and accommodating magazines 27 in which the molded products 2 are piled by the pick-up 26.

The molded product 2 on the lower die 18 is transferred to the moving table 25, which has been waited at a receiving position "U", by the unloader 23. The moving table 25 holding the molded product 2 is moved to an accommodating position "V", then the molded product 2 is sucked and held by the pick-up 26. When the pick-up 26 holds the molded product 2, the moving table 25 is returned from the accommodating position "V" to the receiving position "U". The pick-up 26 holding the molded product 2 turns, for example, 90° so as to head the molded product 2 in a prescribed direction. Then, the pick-up 26 piles the molded product 2 in the accommodating magazine 27.

Figure 1:
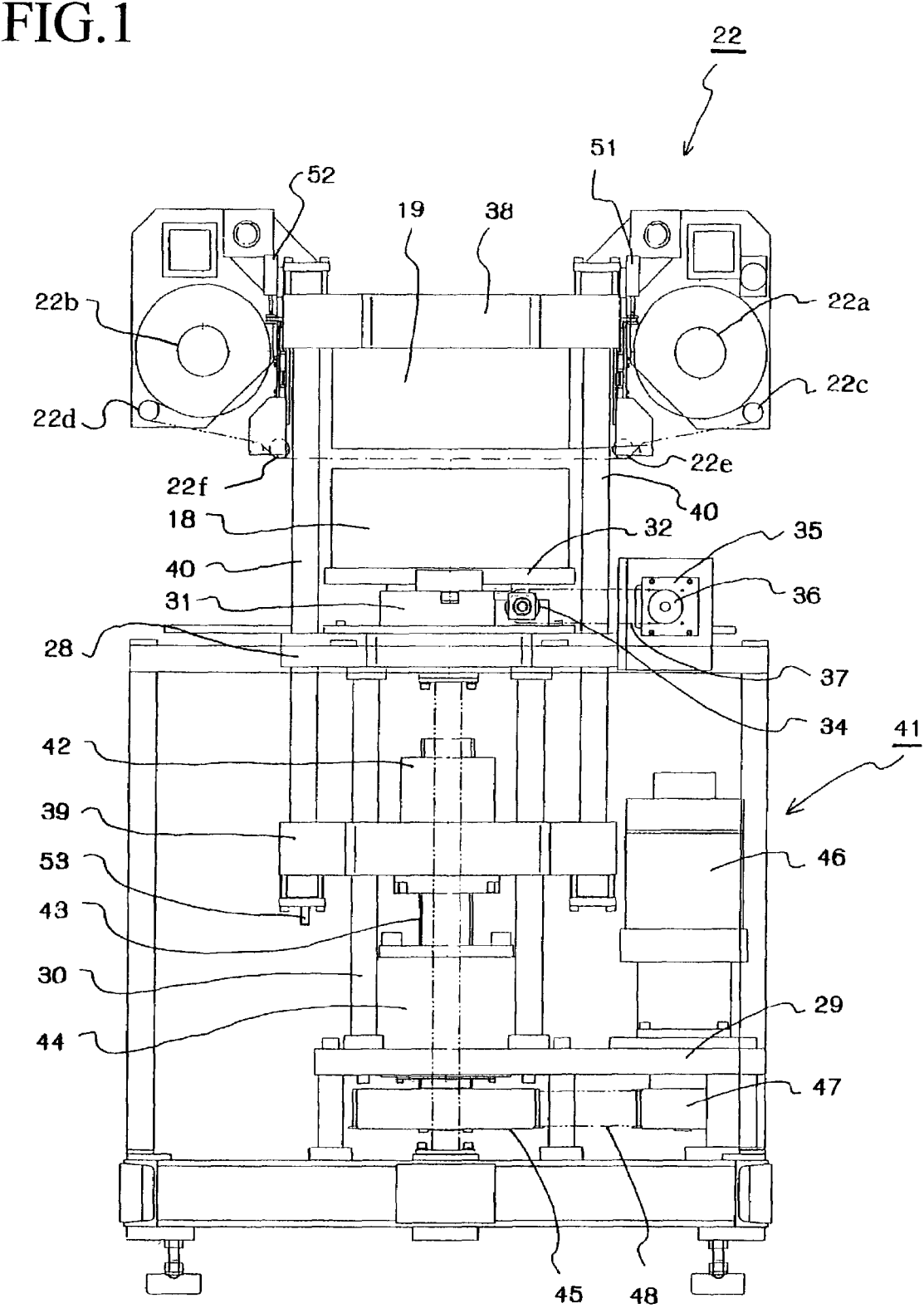
FIG. 1 is a rear view of a compression molding machine of an embodiment of the present invention.
Figure 2:
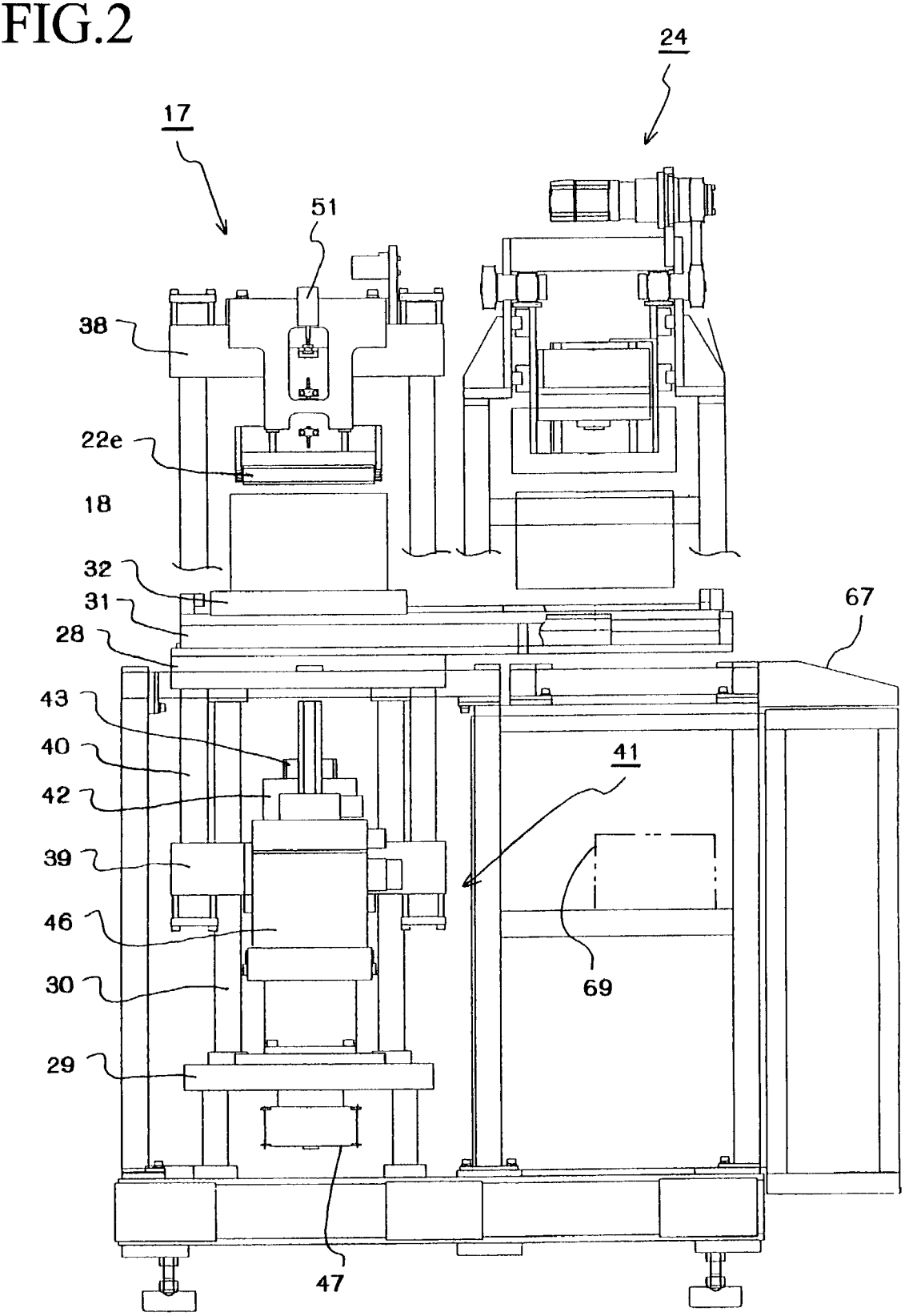
FIG. 2 is a right side view of the compression molding machine shown in FIG. 1.

Next, the compression molding machine 17 will be explained with reference to FIGS. 1–4. In FIGS. 1 and 2, the lower die 18 is held by a fixed platen 28. No through-holes for a multi-plunger unit are formed in the fixed platen 28, so the fixed platen 28 is capable of applying enough pressure to the lower die 18 when the dies 18 and 19 are closed. The fixed platen 28 is supported by fixed tie bars 30, which are vertically extended from a base board 29.

Figure 3:
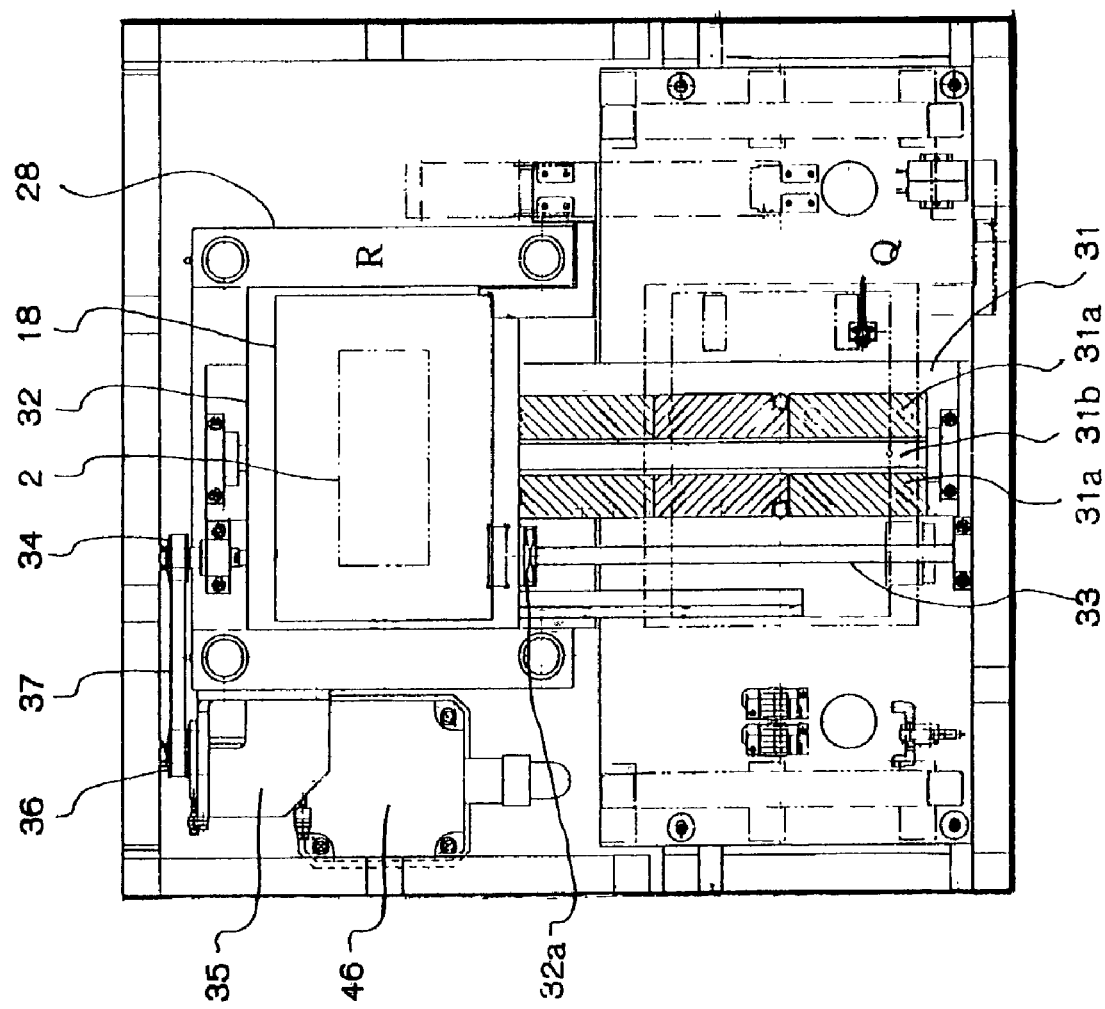
FIG. 3 is a plan view of a lower die.

In FIG. 3, the lower die 18 can be moved between the clamping position "R" and the transfer position "Q", which is outside of the dies. A guide plate 31 is provided on the fixed platen 28. The guide plate 31 has a guide rail 31a and a guide groove 31b, which are extended between the positions "Q" and "R". A slide plate 32 is slidably engaged with the guide rail 31a and the guide groove 31b. The lower die 18 is supported by the slide plate 32. A nut section 32a is integrated with the slide plate 32. A screw shaft 33 is screwed with the nut section 32a. The screw shaft 33 is supported on the fixed platen 28 and arranged parallel to the guide rail 31a and the guide groove 31b. A pulley 34 is fixed to one end of the screw shaft 33. A pulley 36 is fixed to a motor shaft of a motor 35. An endless timing belt 37 is engaged with the pulleys 34 and 36. When the motor 35 is driven, the screw shaft 33 is turned by the timing belt 37, the slide plate 32, whose nut section 32a is screwed with the screw shaft 33, is moved between the positions "Q" and "R" together with the lower die 18.

In FIG. 1, the upper die 19 is held by an upper movable platen 38 and capable of moving to and away from the lower die 18. The upper movable platen 38 is supported by four movable tie bars 40, which is vertically extended from a lower movable platen 39. By moving the lower movable platen 39 in the vertical direction, the upper movable platen 38, which is supported by the movable tie bars 40, is moved in the vertical direction together with the lower movable platen 39, so that the dies 18 and 19 can be opened and closed.

In FIGS. 1 and 2, an open-close mechanism 41 opens and closes the dies 18 and 19. The lower movable platen 39 has a nut section 42, and a screw shaft 43 is screwed with the nut section 42. With this structure, the lower movable platen 39 is moved in the vertical direction by turning the screw shaft 43, so that the dies 18 and 19 can be opened and closed. The screw shaft 43 is vertically extended from a supporting member 44, which is provided on the base board 29. A lower end section of the screw shaft 43 is projected downward from the base board 29, and a pulley 45 is fixed to the lower end section. A servo motor 46 is provided on the base board 29. A pulley 47 is fixed to a motor shaft of the servo motor 46. An endless timing belt 48 is engaged with the pulleys 45 and 47. Reduction ratio between the pulleys 45 and 47 is great, so that a great clamping force can be gained without employing a large motor. When the servo motor 46 is driven, the screw shaft 43 is turned by the timing belt 48, so that the lower movable platen 39 is moved in the vertical direction together with the nut section 42.

By turning the screw shaft 43 by the motor 46, the clamping force is applied to the dies. When a pressure sensor 53 (see FIG. 1), which is assembled in the movable tie bar 40, detects that the clamping force reaches a prescribed value, a motor driver circuit stops the motor 46. In the present embodiment, the loader 20 and the unloader 23 do not enter a space between the opened dies 18 and 19, so that a moving stroke of the upper die 19 can be short, and the maximum moving speed of the upper die may be 10 mm/sec. Therefore, a large size motor is not required.

Figure 4:
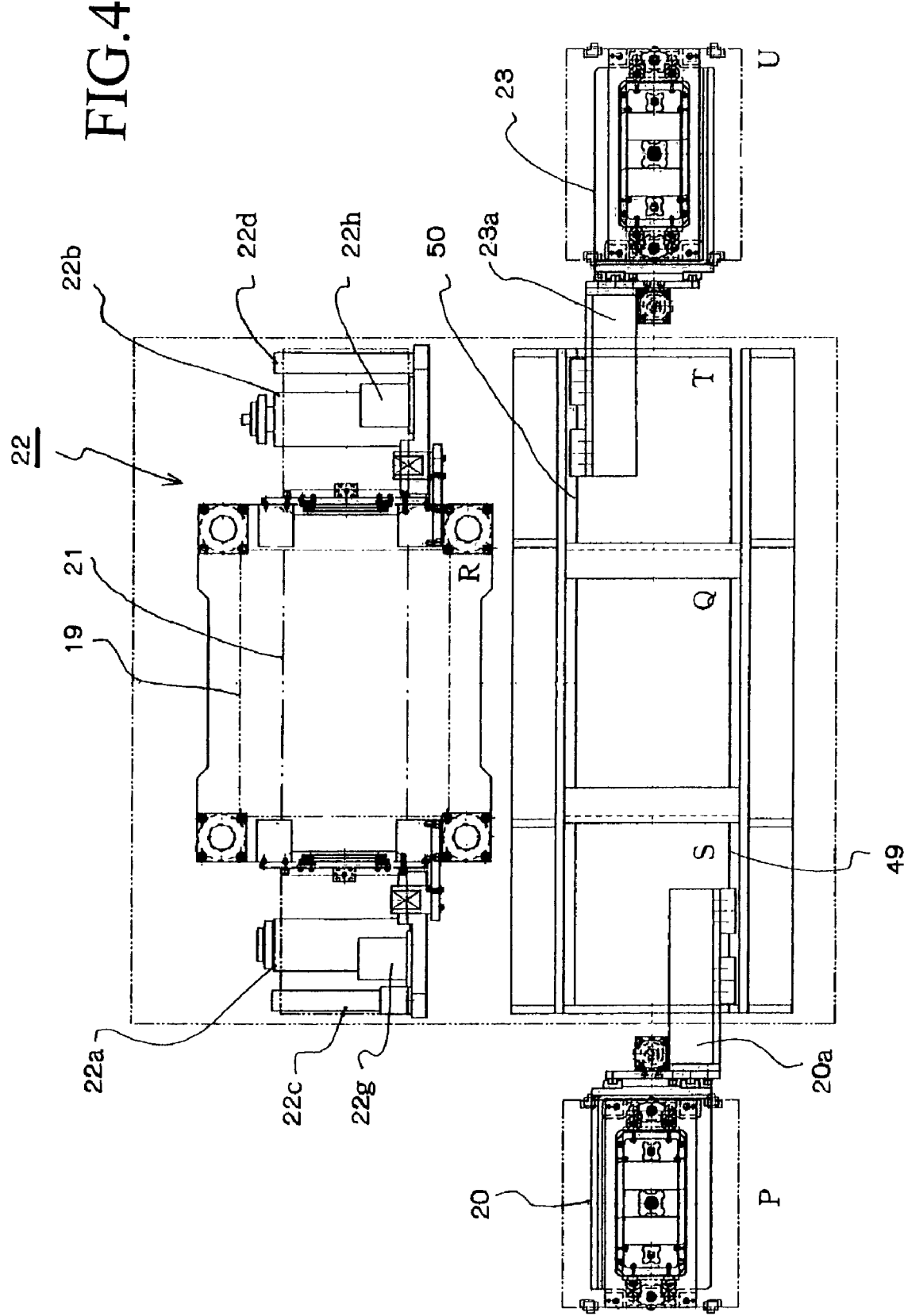
FIG. 4 is a plan view of an upper die.

In FIG. 4, the substrate 2 is transferred to the lower die 18, which has waited at the transfer position "Q", by the loader 20; the molded product 2 is taken out, by the unloader 23, at the same position "Q". An arm section 20a of the loader 20 is capable of sliding on guide rails 49. The arm section 20a is reciprocally moved between the dispensing position "P" of the resin supplying unit 8 and the transfer position "Q" of the lower die 18. An arm section 23a of the unloader 23 is capable of sliding on guide rails 50. The arm section 23a is reciprocally moved between the transfer position "Q" of the lower die 18 and the receiving position "U" of the moving table 25.

In FIG. 1, the cavity (not shown) is formed in the upper die 19. The cavity is capable of accommodating a plurality of semiconductor chips on the substrate 2, therefore the semiconductor chips can be simultaneously molded with resin. The film feeding mechanism 22 is provided to the upper movable platen 38 so as to cover the parting face of the upper die 19 including the cavity with the release film 21. The feeding roll 22a is located on one side of the upper movable platen 38; the collecting roll 22b is located on the other side. As described above, the release film 21 is fed from the feeding roll 22a, and the used parts of the release film 21 are wound on the collecting roll 22b.

A feeding roller 22c feeds the release film 21; a collecting roller 22d collects the used parts of the release film 21. A guide roller 22e is provided on the feeding roller 22c side; a guide roller 22f is provided on the collecting roller 22d side. The guide roller 22e is vertically moved by a vertical cylinder 51; the guide roller 22f is vertically moved by a vertical cylinder 52. By vertically moving the guide rollers 22e and 22f, the release film 21 is fit on and left from the parting face of the upper die 19. Namely, the guide rollers 22e and 22f are moved upward to fit the release film 21 on the parting face of the upper die 19 when the substrate 2 is molded; the guide rollers 22e and 22f are moved downward to separate the release film 21 from the parting face when a prescribed length of the release film 21 is newly fed for the next mold. A motor 22g for rotating the feeding roll 22a and a motor 22h for rotating the collecting roll 22b are synchronously driven so as to feed and collect the prescribed length of the release film 21 (see FIG. 4).

Control of the open-close mechanism 41 will be explained with reference to a block diagram of FIG. 8. A control unit 69 includes a CPU 60 which sends command signals to every section of the mechanism 41 on the basis of inputted signals, a ROM 61 which previously stores control programs for opening and closing the dies 18 and 19, a timer 63 which measures operating time of the motor 46 closing the dies, etc.

An input-output (I/O) section 64 inputs signals to the CPU 60 and receives signals therefrom. A clamping force detecting section 65 includes the pressure sensor 53 assembled in the movable tie bar 40. A motor pulse measuring section 66 includes a rotation sensor of the servo motor 46. An operator inputs control commands and control data of the mechanism 41 by an operating section 67. A motor driver section 68 includes a driver circuit for driving the servo motor 46 for opening and closing the dies.

When the operator inputs a mold starting command by the operating section 67, the motor driver section 68 of the control unit 69 drives the motor 46, so that the screw shaft 43 is turned and the dies 18 and 19 clamp the substrate 2. When the clamping force detecting section 65 detects the clamping force reaching the prescribed value, the motor driver section 68 stops the motor 46. A moving distance of the upper die 19 is controlled on the basis of data measured by the motor pulse measuring section 66. The clamping speed of the upper die 19 is controlled by changing a rotational speed of the servo motor 46, which is measured by the motor pulse measuring section 66. As described above, the moving stroke of the upper die 19 is short, and the maximum moving speed of the upper die is 10 mm/sec. Therefore, a large size motor is not required as the motor 46.

Next, action of the compression molding 17 machine will be explained with reference to FIGS. 5 and 6. The upper die 19 is in an opening state. The lower die 18 is waiting at the transfer position "Q". Since the lower die 18 is reciprocally moved between the positions "Q" and "R", the loader 20 and the unloader 23 work outside of the dies 18 and 19, so the moving stroke of the upper die 19, which is vertically moved by the screw shaft 43, may be 20–30 mm.

The substrate 2 on which the liquid resin is applied by the resin supplying unit 8 is held by the loader 20 and conveyed from the dispensing position "P" to the transfer position "Q". When the substrate 2 is transferred from the loader 20 to the lower die 18, the motor 35 is driven to turn the screw shaft 33. By turning the screw shaft 33, the slide plate 32 is moved from the transfer position "Q" to the clamping position "R". Upon transferring the substrate 2, the loader 20 returns from the transfer position "Q" to a waiting position "S" and waits there until the next substrate 2 is supplied (see FIG. 4). At that time, the guide rollers 22e and 22f are moved upward so as to fit the release film 21 onto the parting face of the upper die 19. Then, the motor 46 is driven to turn the screw shaft 43. By turning the screw shaft 43, the movable platens 38 and 39 are moved downward, so that the upper die 19 is moved downward and the dies 18 and 19 are closed. The substrate 2 is compression-molded in the closed dies 18 and 19. When the upper die 19 is close to the lower die 18, the upper die 19 is moved at low speed, e.g., 0.1 mm/sec. or less; in other states, the upper die 19 may be moved at higher speed. By this speed control, quality of the molded products can be improved.

After completing the compression mold, the motor 46 is driven again so as to turn the screw shaft 43 in the opposite direction. By turning the screw shaft 43 in the opposite direction, the movable platens 38 and 39 are moved upward, so that the upper die 19 is also moved upward and the dies 18 and 19 are opened. Further, the motor 35 is driven to turn the screw shaft 33 in the opposite direction. By turning the screw shaft 33 in the opposite direction, the slide plate 32 is moved from the clamping position "R" to the transfer position "Q". The molded product 2 is held by the unloader 23, which has been waited at the transfer position "Q", and transferred to the moving table 25, which has been waited at the receiving position "U". Upon transferring the molded product 2, the unloader 23 returns from the receiving position "U" to a waiting position "T" and waits there until the next product 2 is supplied (see FIG. 4).

Control of the clamping speed on the basis of a flowing speed of the liquid resin will be explained.

As a premise, the liquid resin flows in the transverse direction of the substrate 2. The clamping speed of the upper die 19 is controlled on the basis of the flowing speed of the liquid resin.

Figure 9:
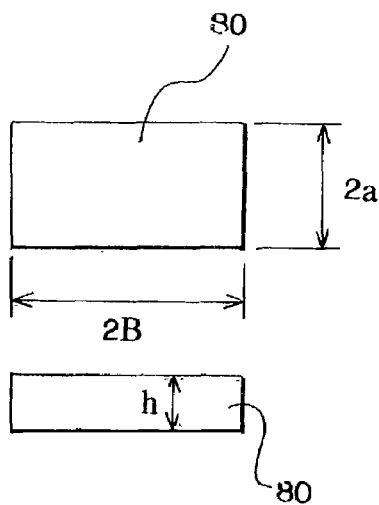
FIG. 9 is an explanation view of liquid resin applied.

Firstly, as shown in FIG. 9, the liquid resin 80 is applied to form a rectangular shape, and the flowing speed of the applied resin 80 in the transverse direction is controlled. Parameters are defined as follows: "t" is time (sec.) to completely clamp the substrate 2; "a" is a half of a width (mm) of the resin 80 after the time "t" is elapsed; "B" is a half of a length (mm) of the resin 80 and fixed; "h" is height (mm) of the resin 80 after the time "t" is elapsed; "H" is the height (mm) of the resin 80 immediately before clamping the substrate 2; "M" is volume (mm$^3$) of the resin 80 and fixed; and "V" is the clamping speed (mm/sec.) of the upper die 19 and fixed.

The volume "M" of the applied resin 80 is, $$M = 2B \cdot 2a \cdot h \qquad \text{(Formula 1)}$$

The height "h" after the time "t" elapsed is, $$h = H - Vt \qquad \text{(Formula 2)}$$

According to the Formulas 1 and 2, $$M = 4aB(H - Vt)$$

Therefore, $$a = M/4B(H - Vt)$$

This is differentiated by the time "t".

$$da/dt = M/4B \cdot V/(H - Vt)^2 \qquad \text{(Formula 3)}$$

According to the Formulas 1 and 2, $$M/4B = ah \text{ and } H - Vt = h$$

Therefore, $$da/dt = V \cdot a/h \qquad \text{(Formula 4)}$$

Note that, the volume "M" of the liquid resin 80 is very small, so the Formula 4 may be defined by differentiating a formula "dh·2a·2B=2da·2B·h" by the time "t".

In the Formula 4, the clamping speed "V" is fixed, so the flowing speed "da/dt" of the resin 80 depends on the height "h" and the width "a". In this case, the flowing speed "da/dt" of the liquid resin 80 in the transverse direction is in proportion to the width "a" of the resin 80; the flowing speed is in inverse proportion to the height "h" of the resin 80. Preferably, the clamping speed "V" of the upper die 19 is properly controlled by using these relationships.

Figure 11:
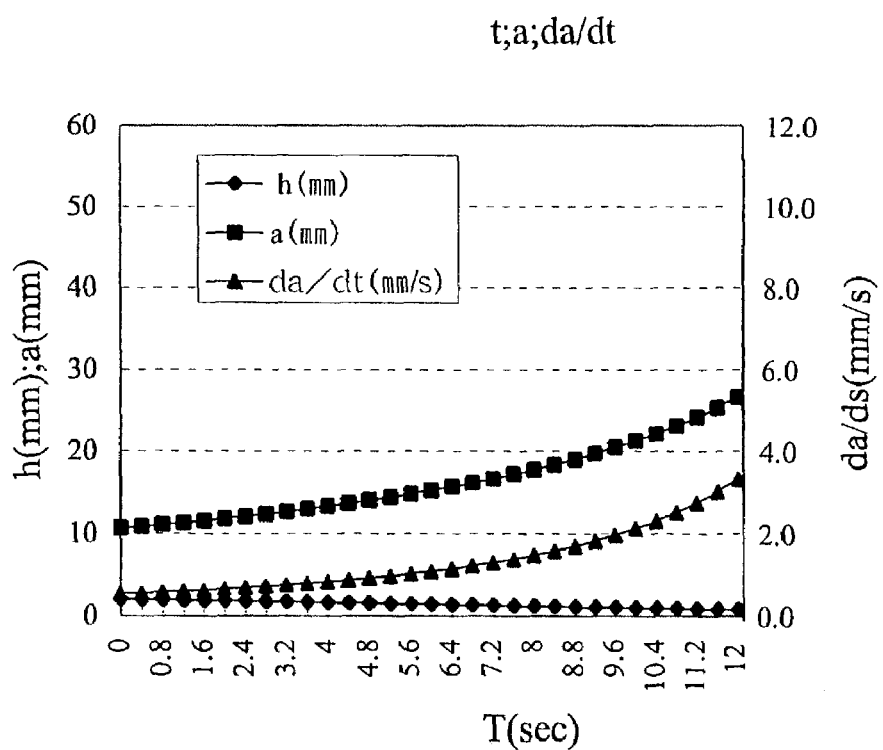
FIG. 11 is a graph corresponding to the data shown in FIG. 10.

Data of an experiment are shown in FIG. 10; a graph corresponding to the data is shown in FIG. 11. The experiment was executed under the following conditions: the clamping speed "V" was 0.1 mm/sec.; the height "Hb" of the resin 80 before clamping was 2 mm; the height "He" of the resin 80 after clamping was 0.8 mm; the volume "M" of the resin 80 was 8000 mm$^3$; and the length "B" was 94 mm (fixed). The data are the height "h", the width "a" and the flowing speed "da/dt" of the resin 80.

According to the data shown in FIGS. 10 and 11, in the case of clamping at a fixed speed, the flowing speed of the liquid resin 80 is accelerated as the liquid resin 80 approaches to a terminal end of the cavity. The maximum flowing speed was 3.3 mm/sec. In the case that the height "Hb" of the resin 80 before clamping is low, the required clamping time "t" can be shortened in spite of a low clamping speed. The data says, for example, if the clamping speed "V" is 0.2 mm/sec. and the height "Hb" of the resin 80 is 2 mm, the required time "t" is 12 sec.; if the height "Hb" is 5 mm, the required time is 42 sec.

The flowing speed of the liquid resin 80 is accelerated as the resin 80 approaches to the terminal end of the cavity. If the resin 80 collides with the terminal end at a high speed, the resin 80 bounds so that quality of the molded product must be low. Therefore, preferably the clamping speed "V" of the upper die 19 is 0.1 mm/sec. or less so as to reduce the flowing speed "da/dt" of the resin 80 immediately before clamping.

Next, another example will be explained with reference to FIGS. 12–14.

As a premise, the work piece is the silicon wafer 7 (see FIG. 7A), and the liquid resin 80 is applied to form a circular shape, and the flowing speed of the applied resin 80 in the radial direction is controlled. The clamping speed of the upper die 19 is controlled on the basis of the flowing speed of the liquid resin 80.

Figure 12:
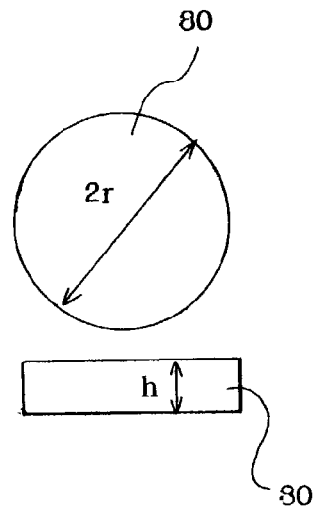
FIG. 12 is an explanation view of the liquid resin applied by another manner.

As shown in FIG. 12, the liquid resin 80 is applied to form the circular shape, and the clamping speed of the upper die 19 is controlled to flow the liquid resin 80 in the radial direction at a fixed flowing speed. Parameters are defined as follows: "t" is time (sec.) to completely clamp the substrate 2; "r" is a radius (mm) of the resin 80 after the time "t" is elapsed; "h" is height (mm) of the resin 80 after the time "t" is elapsed; "K" is the flowing speed (mm/sec.) of the resin 80 in the radial direction and fixed; "R" is the radius (mm) of the resin 80 immediately before clamping the substrate 2; "H" is height (mm) of the resin 80; and "M" is volume (mm$^3$) of the resin 80 and fixed.

The volume "M" of the applied resin 80 is, $$M=\pi r^2 \cdot h \quad \text{(Formula 5)}$$

The radium "r" after the time "t" elapsed is, $$r=R+Kt \quad \text{(Formula 6)}$$

According to the Formulas 5 and 6, $$M=\pi \cdot (R+Kt)^2 \cdot h$$

Therefore, $$h=M/(\pi \cdot (R+Kt)^2)$$

This is differentiated by the time "t".

$$dh/dt=-2MK/\pi \cdot \{(R+Kt)^{-3}\} \quad \text{(Formula 7)}$$

According to the Formulas 5 and 7, $$dh/dt=-2Kh/r \quad \text{(Formula 8)}$$

Note that, the volume "M" of the liquid resin 80 is very small, so the Formula 8 may be defined by differentiating a formula "dh·πr$^2$=dr·2πr·h" by the time "t".

In the Formula 8, the flowing speed "K" of the resin 80 is fixed, so the clamping speed of the upper die 19 depends on the radius "r" and the height "h". In this case, the clamping speed of the upper die 19 is in proportion to the height "h" of the resin 80; the clamping speed is in inverse proportion to the radius "r" of the resin 80. Preferably, the clamping speed of the upper die 19 is properly controlled by using these relationships.

Figure 14:
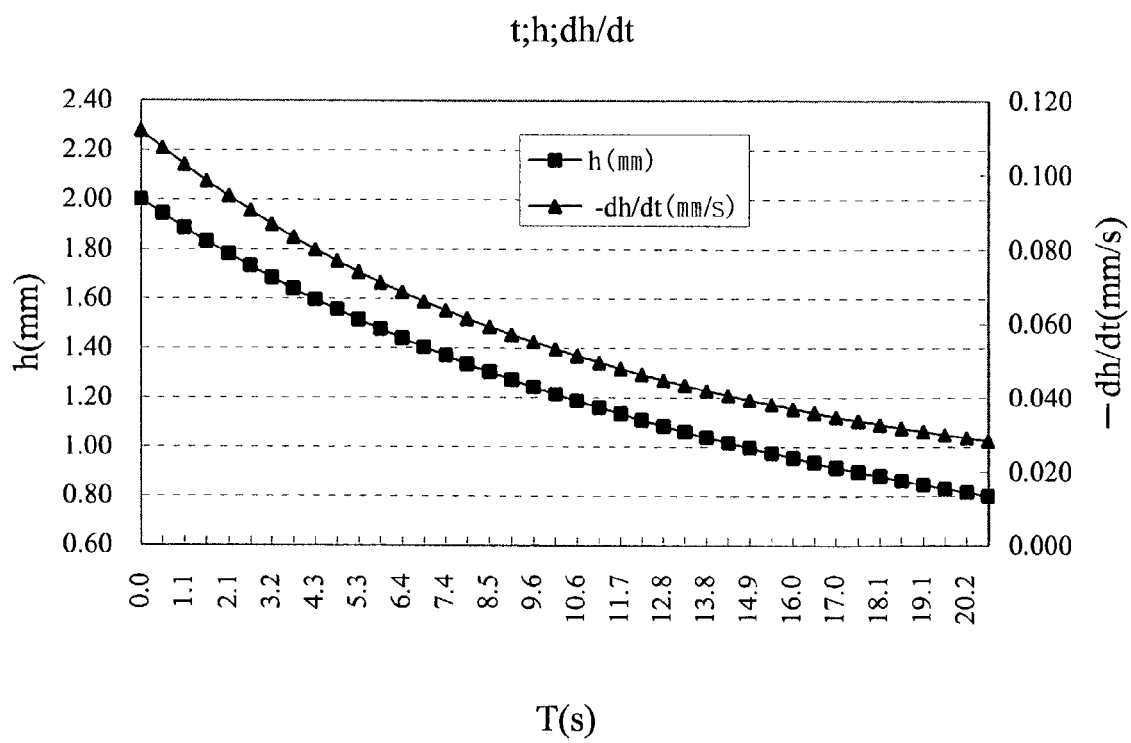
FIG. 14 is a graph corresponding to the data shown in FIG. 13.

Data of an experiment are shown in FIG. 13; a graph corresponding to the data is shown in FIG. 14. The experiment was executed under the following conditions: the flowing speed "K" of the resin 80 was 1.0 mm/sec. (fixed); the height "Hb" of the resin 80 before clamping was 2 mm; the height "He" of the resin 80 after clamping was 0.8 mm; and the volume "M" of the resin 80 was 8000 mm$^3$. The data are the height "h", the radius "r" and the clamping speed "dh/dt" of the upper die 19.

According to the data shown in FIGS. 13 and 14, in the case of clamping at a fixed speed (e.g., 0.1 mm/sec.), the required time "t" was 12 sec.; in the case that the maximum clamping speed was set to 0.39 mm/sec. and the minimum clamping speed was set to 0.1 mm/sec. so as to maintain the maximum flowing speed of the resin 80, the required time was 5.9 sec.

According to the data, by controlling the clamping speed "dh/dt" so as to maintain the flowing speed of the resin 80, the compression molding can be executed without reducing manufacturing efficiency. The preferable flowing speed of the resin 80, e.g., 1.0 mm/sec., is defined so as to maintain quality of the molded product. The flowing speed of the liquid resin 80 is accelerated as the resin 80 approaches to the terminal end of the cavity. If the resin 80 collides with the terminal end at a high speed, the resin 80 bounds so that quality of the molded product must be low. Therefore, the clamping speed must be properly controlled.

The open-close mechanism 41 controls the clamping speed of the upper die 19 so as to adjust the flowing speed of liquid resin 80, which is extended on the work piece, until completing the extension of the liquid resin. The liquid resin 80 is extended (or broadened) on the work piece when the work piece is clamped together with the liquid resin 80 by the dies 18 and 19. For example, the control of the clamping speed comprises the steps of: dividing a distance of flowing the liquid resin 80 until completing the extension into a plurality of sub-distances, which are varied in geometrical progression; and varying a common ratio of the geometrical series so as to vary the clamping speed of the upper die 19. With this control, the flowing speed of an edge of the extending liquid resin 80 in each sub-distance can be properly controlled. To stably flow the liquid resin, the clamping speed of the upper die 19 is reduced so as to reduce the flowing speed of the liquid resin 80 as the liquid resin approaches to the terminal end of the cavity.

Details of this control will be explained. In the present explanation, "ΔH" is a total moving distance of the movable platen while extending the liquid resin 80; "ΔT" is, required time for completing the extension of the resin 80; "N" is number of changing the clamping speed; "n" is an assigned number of a speed changing point at which the clamping speed is changed (the resin extension completes at the point "n=1"); "Hn" is a moving distance of the movable platen between the points "n" and "n−1 " (or in the sub-distance); "Vn" is a moving speed of the movable platen between the points "n" and "n−1"; and "r" is the common ratio.

The distance "ΔH" is divided into "N" of sub-distances.

$$\Delta H = \Sigma Hn = H1 \cdot (1-r^N)/(1-r)$$

Therefore, $$H1 = \Delta H \cdot (r-1)/(r^N-1)$$

$$Hn = \Delta H \cdot (r-1)/(r^N-1) \cdot r^{(n-1)}$$

It takes the time "ΔT/N" to move the movable platen in each sub-distance "Hn".
Therefore, $$Vn = N \cdot (\Delta H/\Delta T) \cdot (r-1)/(r^N-1) \cdot r^{(n-1)}$$

The moving time in each sub-distance is equal; the moving distances are varied in geometrical progression. Therefore, the moving speed of the movable platen 38,39 can be controlled by varying the common ratio "r".

If viscosity of the liquid resin is low immediately after the beginning of the extension of the resin, a greater common ratio "r" is selected so as to accelerate the flowing speed of the edge of the resin. By accelerating the flowing speed, a molding area can be broadened. On the other hand, the flowing speed of the edge of the liquid resin 80 is reduced immediately before completing the extension.

Figure 16:
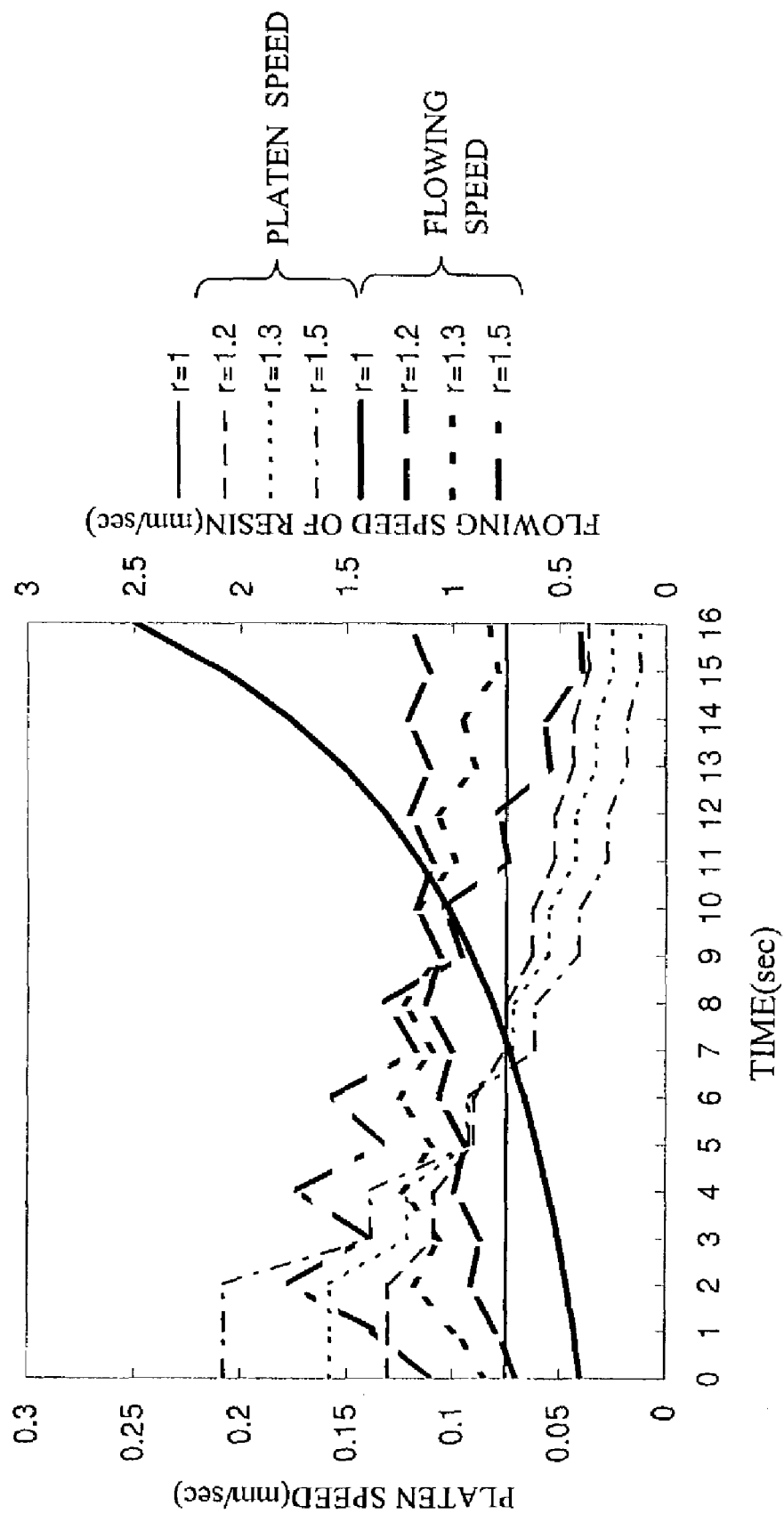
FIG. 16 is a graph corresponding to the data shown in FIG. 15.
Figure 18:
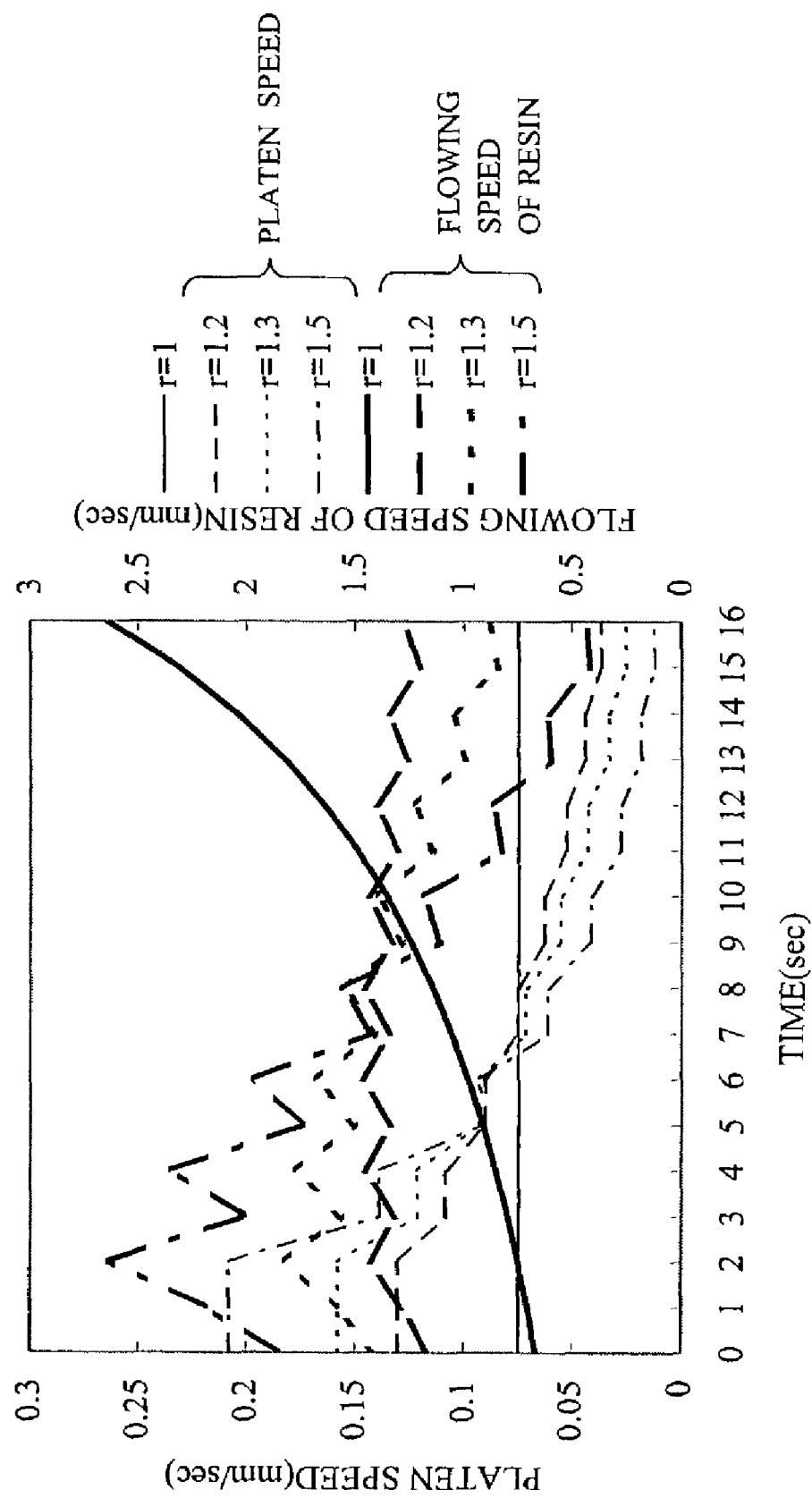
FIG. 18 is a graph corresponding to the data shown in FIG. 17.

Data relating a relationship among the common ratio "r" for molding the rectangular work piece, the platen speed, the flowing speed of the edge of the liquid resin 80, etc. are shown in FIG. 15. FIG. 16 is a graph corresponding to the data shown in FIG. 16. Further, data relating a relationship among the common ratio "r" for molding the circular work piece, the platen speed and the height of the liquid resin 80 are shown in FIG. 17. FIG. 18 is a graph corresponding to the data shown in FIG. 17. In the both cases, the initial height of the resin is 2 mm; the height of the resin completely extended is 0.8 mm; and time for completely extending the resin is 16 sec.

To move the edge of the liquid resin at the fixed flowing speed, the preferable common ratio "r" is 1.2 or 1.3. To reduce the flowing speed of the liquid resin in the vicinity of the terminal end of the cavity due to viscosity, etc., the preferable common ratio "r" is 1.5 or more. The preferable common ratios "r" are respectively selected for the speed changing points "1→N", so that the platen speed (the clamping speed of the movable die 19) and the flowing speed of the edge of the resin can be properly controlled.

Figure 19:
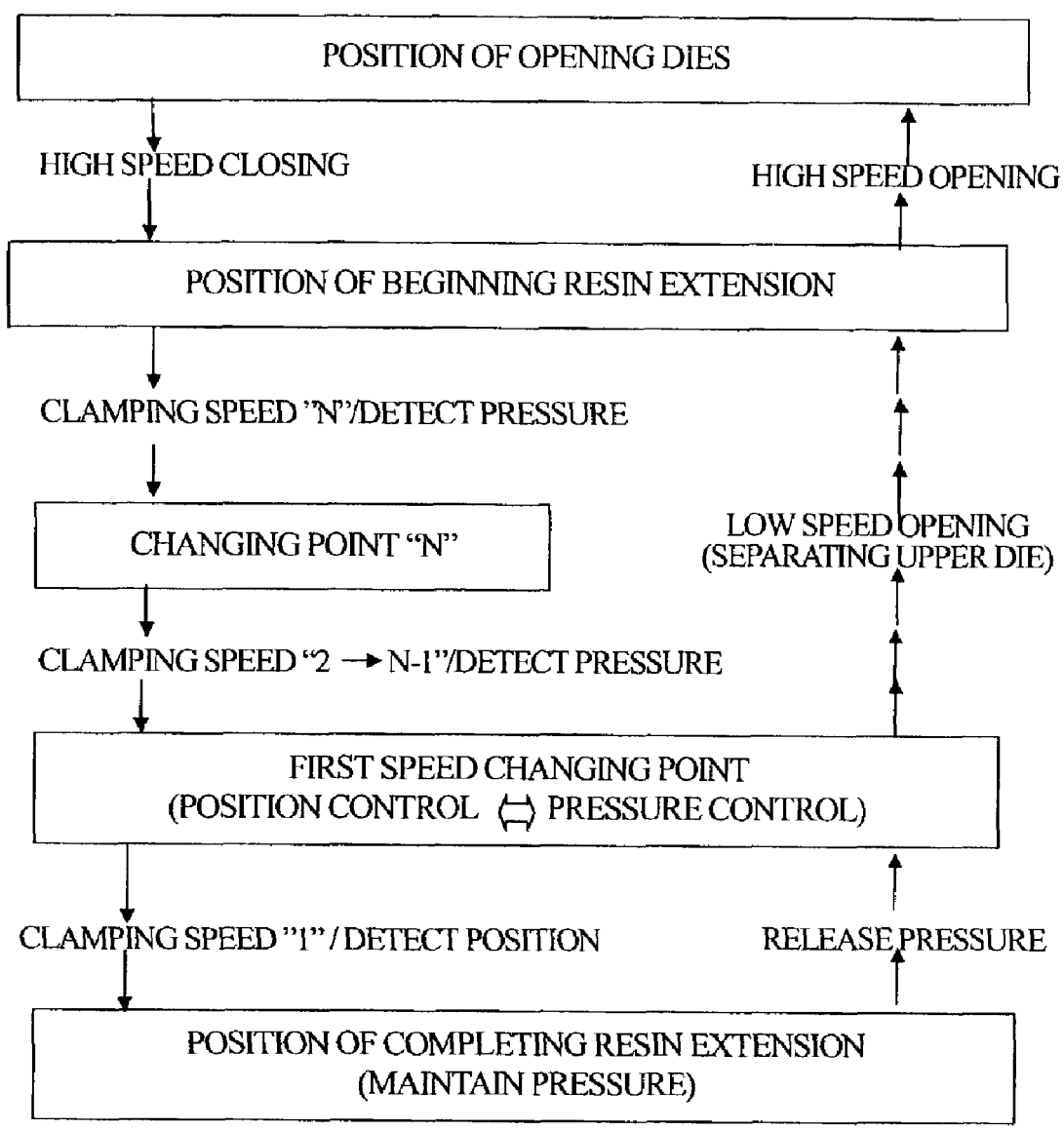
FIG. 19 is a flow chart showing an example of action of closing dies.

Next, control of the clamping action will be explained with reference to a flow chart of FIG. 19.

In the case of closing the dies 18 and 19 which have been opened, the upper die 19 is moved toward the lower die 18 at high speed until the upper die 19 begins the extension of the liquid resin. When the upper die 19 reaches the position at which the die 10 begins the extension of the resin, the rotational speed of the motor 46 is reduced on the basis of the selected common ratios "r" from the speed changing point "N−1" to the speed changing point "2". By reducing the rotational speed of the motor 46, the clamping speed of the die 19 is also reduced to the clamping speed "N". Note that, the common ratios "r" are previously selected with considering the flowing speed of the resin, etc. and stored in the control unit 69 with control programs. At the speed changing points "N→2", the clamping force (pressure) is measured by the pressure sensor 53. By measuring the clamping force, abnormal force or pressure, which is caused by alien substances existing between the dies, can be detected.

When the upper die 19 reaches the first speed changing point and the clamping force reaches the prescribed value, the stop position of the upper die 19 or the movable platen is detected by a rotary sensor. If the stop position is higher than an object height, an alien substance is clamped or an amount of the resin is excess. On the other hand, if the stop position is lower than the object height, the amount of the resin is insufficient. When the extension of the resin is completed, the pressure is maintained to solidify the resin. By solidifying the resin, the package section of the molded product is formed. A full clamping position of the upper die 19 is detected by the pressure sensor; the clamping position thereof is detected by the rotary sensor.

Die opening action is executed by the reverse steps of the clamping action. The upper die 19 is moved to the first speed changing point, at low speed, with releasing pressure. The upper die 19 is moved from the speed changing point "2" to the speed changing point "N" at varied or fixed low speed. From the position at which the die 10 begins the extension to the initial opening position, the upper die 19 is moved at high speed.

Note that, in the present embodiment, the lower die 18 is moved between the clamping position "R" and the transfer position "Q", so the loader 20 and the unloader 23 can be operated outside of the dies 18 and 19. Therefore, the stroke of the upper die 19, which is driven by the screw shaft 43, may be short, e.g., 20–30 mm.

The upper die 19 is moved at low speed in the vicinity of the first speed changing point or immediately before closing dies; in other positions, the upper die 19 is moved at high speed. With this control, quality of the molded product can be improved.

In the compression molding machine 17 of the present embodiment, the screw shaft 43 for clamping the work piece is directly connected to the lower movable platen 39, the upper movable platen 38 is connected to the upper movable platen 38, and the upper die 19, which is moved together with the upper movable platen 38, is moved to open and close the dies. With this structure, the upper die 19 can be moved with maintaining parallel to the lower die 18. Since no through-holes are bored in the fixed platen 28 which holds the lower die 18, enough pressure can be applied while closing the dies, no resin flashes are formed in molded product and quality of the product can be improved.

The lower die 18 is moved between the clamping position "R" and the transfer position "Q" so as to set the work piece and take out the product, so that the stroke of the upper die 19 can be shorter. By shortening the stroke of the upper die 19, the upper die 19 may be driven at lower clamping speed, so that a large driving source is not required, the size of the molding machine can be smaller and productivity of the molding machine can be improved.

By employing the servo motor 46 for turning the screw shaft 43 to open and close the dies, the control of the upper die 19 can be simplified and thickness of a molded section can be precisely controlled.

By employing the open-close mechanism and the method of opening and closing dies, the work piece is clamped by the dies 18,19 together with the liquid resin 80, and the clamping speed of the upper die 19 can be controlled so as to flow the liquid resin 80 at the desired flowing speed from the beginning of the extension of the resin until the termination thereof. Therefore, the compression-molding can be executed with considering the flowing speed of the resin, so that damage of the product can be prevented and quality of the product and productivity of the molding machine can be improved.

For example, in the open-close mechanism 41, the distance of flowing the liquid resin 80 until completing the extension is divided into a plurality of sub-distances, which are varied in geometrical progression, then the common ratio of the geometrical series of the sub-distances is selected, and the clamping speed of the upper die 19 is controlled so as to adjust the flowing speed of the edge of the extending liquid resin 80 in each sub-distance. Further, the clamping speed of the upper die 19 is reduced so as to reduce the flowing speed of the liquid resin 80 as the liquid resin 80 approaches to the terminal end of the cavity. With this control, the flowing speed of the edge of the liquid resin 80 can be properly controlled in each sub-distance, so that action of the liquid resin 80 can be stable and quality of the product can be improved. Further, productivity and manufacturing efficiency can be improved by selecting the optimum clamping speed.

The present invention is not limited to the above described embodiment. A resin feeding section is not integrated with the compression molding machine 17, but a wide working space exists at the transfer position "Q", so the liquid resin may be applied to the work piece at the transfer position "Q". Further, the lower die 18 may be cleaned at the transfer position "Q". The movement of the dispenser 13 may be optionally selected on the basis of a shape of a work piece, a shape of a nozzle 13a of the dispenser 13, etc. Further, the resin may be applied by other means other than the dispenser.

In the above described embodiments, one work piece is molded in one cavity, but number of the work piece and the cavity are not limited to one.

Namely, number of the cavity in the die may be two or more. In this case, a plurality of work pieces can be compression-molded simultaneously.

In the above described embodiment, the upper die 19 is the movable die, but the lower die 18 may be used as the movable die.

The invention may be embodied in other specific forms without departing from the spirit or essential characteristics thereof. The present embodiments are therefore to be considered in all respects as illustrative and not restrictive, the scope of the invention being indicated by the appended claims rather than by he foregoing description and all changes which come within the meaning and range of equivalency of the claims are therefore intended to be embraced therein.

What is claimed is:

1. A compression molding machine, comprising:
    a fixed platen;
    a movable platen;
    a lower die being held by said fixed platen;
    an upper die being held by said movable platen;
    an open-close mechanism including a screw shaft, which is connected to said movable platen and which is turned by a first servo motor, whereby said upper die can be moved to and away from said lower die so as to open and close said dies, said open-close mechanism for stopping the first servo motor when a force for clamping said dies reaches a prescribed value,
    wherein said lower die is held by a slide plate, which is connected to a nut screwed with the screw shaft turned by a second servo motor and which is reciprocally moved, and
    said slide plate holding said lower die can be reciprocally moved between a clamping position, at which a work piece is clamped between the dies, and a transfer position, at which the work piece or a molded product is transferred, while said dies are opened, by synchronously changing rotational directions of the screw shaft turned by the second servo motor with the open-close action of the movable platen performed by changing rotational directions of the screw shaft turned by the first servo motor.

2. The compression molding machine according to claim 1,
    wherein said upper die is a movable die, and
    a film feeding mechanism, which feeds release film over a parting face of said upper die including a cavity, is provided to said movable platen.

3. A compression molding machine, comprising:
    a fixed die and a movable die for clamping and compression-molding a work piece with liquid resin; and
    an open-close mechanism including a screw shaft, which is connected to a movable platen and which is turned by a first servo motor so as to move said movable die to and away from the fixed die, whereby the dies can be opened and closed,
    wherein a moving distance of said movable die from starting an extension of the liquid resin until completing the extension is divided into a plurality of zones; and
    a geometric ratio is selected so as to vary a speed of the movable die in geometrical progression on the basis of the flowing speed of the front end of the liquid resin in each of the zones, whereby a clamping speed of said movable die can be variably controlled.

4. The compression molding machine according to claim 3,
    wherein said open-closed mechanism reduces the clamping speed of said movable die so as to reduce the flowing speed of the liquid resin as the liquid resin approaches a terminal end of a cavity.

5. The compression molding machine according to claim 3,
    wherein said open-closed mechanism controls the clamping speed of said movable die by changing a rotational speed of said servo motor on the basis of the flowing speed of the front end of the liquid resin.

* * * * *